United States Patent
Zhang et al.

(10) Patent No.: US 11,128,435 B2
(45) Date of Patent: Sep. 21, 2021

(54) DISTRIBUTED AND COLLABORATIVE ANALYTICS OF ENCRYPTED DATA USING DEEP POLYNOMIAL NETWORKS

(71) Applicant: Tencent America LLC, Palo Alto, CA (US)

(72) Inventors: Shixiong Zhang, Redmond, WA (US); Dong Yu, Bothell, WA (US)

(73) Assignee: Tencent America LLC, Palo Alto, CA (US)

( * ) Notice: Subject to any disclaimer, the term of this patent is extended or adjusted under 35 U.S.C. 154(b) by 204 days.

(21) Appl. No.: 16/505,368

(22) Filed: Jul. 8, 2019

(65) Prior Publication Data

US 2021/0014039 A1    Jan. 14, 2021

(51) Int. Cl.
| | |
|---|---|
| *H04L 9/06* | (2006.01) |
| *G10L 15/30* | (2013.01) |
| *G06N 3/08* | (2006.01) |
| *G06K 9/62* | (2006.01) |

(52) U.S. Cl.
CPC .......... *H04L 9/0618* (2013.01); *G06K 9/6256* (2013.01); *G06N 3/084* (2013.01); *G10L 15/30* (2013.01)

(58) Field of Classification Search
CPC ...... G06K 9/6256; G06N 3/084; G10L 15/30; H04L 9/0618
USPC ....................................................... 713/189
See application file for complete search history.

(56) References Cited

U.S. PATENT DOCUMENTS

| | | |
|---|---|---|
| 2007/0198828 A1 | 8/2007 | Gonsalves et al. |
| 2016/0098646 A1 | 4/2016 | Gomez et al. |
| 2016/0350648 A1 * | 12/2016 | Gilad-Bachrach ... G06N 3/0481 |
| 2017/0032281 A1 | 2/2017 | Hsu |
| 2017/0269562 A1 | 9/2017 | Dutta et al. |
| 2019/0065974 A1 | 2/2019 | Michigami |
| 2019/0087689 A1 * | 3/2019 | Chen ........................ G06N 3/08 |
| 2019/0279620 A1 * | 9/2019 | Talwar .................... G10L 15/32 |
| 2019/0294805 A1 * | 9/2019 | Taylor .................... G06N 20/10 |

(Continued)

OTHER PUBLICATIONS

Hesamifard et al., "CryptoDL: Deep Neural Networks over Encrypted Data", Nov. 14, 2017, Department of Computer Science and Engineering, University of North Texas pp. 1-20 (Year: 2017).*

(Continued)

*Primary Examiner* — Khalil Naghdali
(74) *Attorney, Agent, or Firm* — Crowell & Moring LLP

(57) ABSTRACT

This disclosure relates to a cloud-local joint or collaborative data analytics framework that provides data analytics models trained and hosted in backend servers for processing data items preprocessed and encrypted by remote terminal devices. The data analytics models are configured to generate encrypted output data items that are then communicated to the local terminal devices for decryption and post-processing. This framework functions without exposing decryption keys of the local terminal devices to the backend servers and the communication network. The encryption/decryption and data analytics in the backend servers are configured to process and communicate data items efficiently to provide real-time or near real-time system response to requests for data analytics from the remote terminal devices.

17 Claims, 15 Drawing Sheets

(56) References Cited

U.S. PATENT DOCUMENTS

2020/0082272 A1* 3/2020 Gu .................. G06N 3/084

OTHER PUBLICATIONS

Hatcher et al., "A Survey of Deep Learning: Platforms, Applications and Emerging Research Trends", IEEE Access 2018 IEEE, pp. 24411-24432 (Year: 2018).*

Aslett et al., "A review of homomorphic encryption and software tools for encrypted statistical machine learning," arXiv preprint arXiv: 1508.06574, pp. 1-21 (2015).

Fan et al., "Somewhat Practical Fully Homomorphic Encryption," IACR Cryptology ePrint Archive, pp. 1-19, (2012).

Gentry, "A Fully Homomorphic Encryption Scheme," A Dissertation Submitted to the Department of Computer Science and the Committee on Graduate Studies of Stanford University in Partial Fulfillment of the Requirements for the Degree of Doctor of Philosophy (2009).

Dowlin et al., "Cryptonets: Applying neural networks to encrypted data with high throughput and accuracy," in ICML, vol. 48, pp. 1-10 (2016).

Han et al., "Deep compression: Compressing deep neural networks with pruning, trained quantization and huffman coding," arXiV preprint arXiv:1510.00149, pp. 1-14 (2015).

Ioffe et al., "Batch normalization: Accelerating deep network training by reducing internal covariate shift," in International Conference on Machine Learning, pp. pp. 1-11 (2015).

Krizhevsky et al. "ImageNet Classification with Deep Convolutional Neural Networks," Advances in neural information processing systems, pp. 1-9 (2012).

Livni et al., "On the Computational Efficiency of Training Neural Networks," Advances in Neural Information Processing Systems, pp. 1-15 (2014).

Lin et al., "Fixed Point Quantization of Deep Convolutional Networks," International Conference on Machine Learning, vol. 48 pp. 1-10 (2016).

Yu et al., "Deep Convolutional Neural Networks With Layer-Wise Context Expansion and Attention Microsoft Research Corporation" Interspeech, pp. 17-21 (2016).

Zhang et al., "Deep Neural Support Vector Machines for Speech Recognition," Speech and Signal Processing (ICASSP), IEEE, pp. 4275-4279 (2015).

Veselý et a;l., "Sequence-discriminative training of deep neural networks," ISCA, pp. 2345-2349 (2013).

Zhang et al., "End-to-End Attention Based Text-Dependent Speaker Verification," Microsoft Corporation—Spoken Language Technology Workshop (SLT), pp. 1-8 (2017).

Maas et al., , "Rectifier Nonlinearities Improve Neural Network Acoustic Models," Proceedings of the $30^{th}$ International Conference on Machine Learning, Vo. 28, pp. 1-6 (2013).

Rivest et al., "A Method for Obtaining Digital Signatures and Public-Key Cryptosystems," Commun. ACM, 21:2, pp. 120-126, (Feb. 1978).

Miotto et al., "Deep learning for healthcare: review, opportunities and challenges," Briefings in bioinformatics, pp. 1-11 (2017).

Saon et al., "English Conversational Telephone Speech Recognition by Humans and Machines," arXiV preprint arXiv: ISCA, pp. 132-136 (2017).

Yu et al., "An Introduction to Computational Networks and the Computational Network Toolkit," Microsoft Technical Report, MSR-TR-2014-112, pp. 1-150 (2016).

Szabó et al.; "An Efficient Hardware Implementation of Feed-Forward Neural Networks"; Applied Intelligence, vol. 21—Special Issue: Engineering Intelligent Systems (Guest Editor: László Monostori); Jan. 2004; pp. 143-158.

Zhang et al.; "Encrypted Speech Recognition Using Deep Polynomial Networks"; Paper presented at ICASSP 2019—2019 IEEE International Conference on Acoustics, Speech and Signal Processing (ICASSP); IEEE; May 12, 2019; five pages.

Zhang et al.; "Encrypted Speech Recognition Using Deep Polynomial Networks"; Slides presented at ICASSP 2019—2019 IEEE International Conference on Acoustics, Speech and Signal Processing (ICASSP); IEEE; May 12, 2019; 28 pages.

International Search Report dated Sep. 3, 2020 for International Application No. PCT/US2020/039805.

Written Opinion dated Sep. 3, 2020 for International Application No. PCT/US2020/039805.

\* cited by examiner

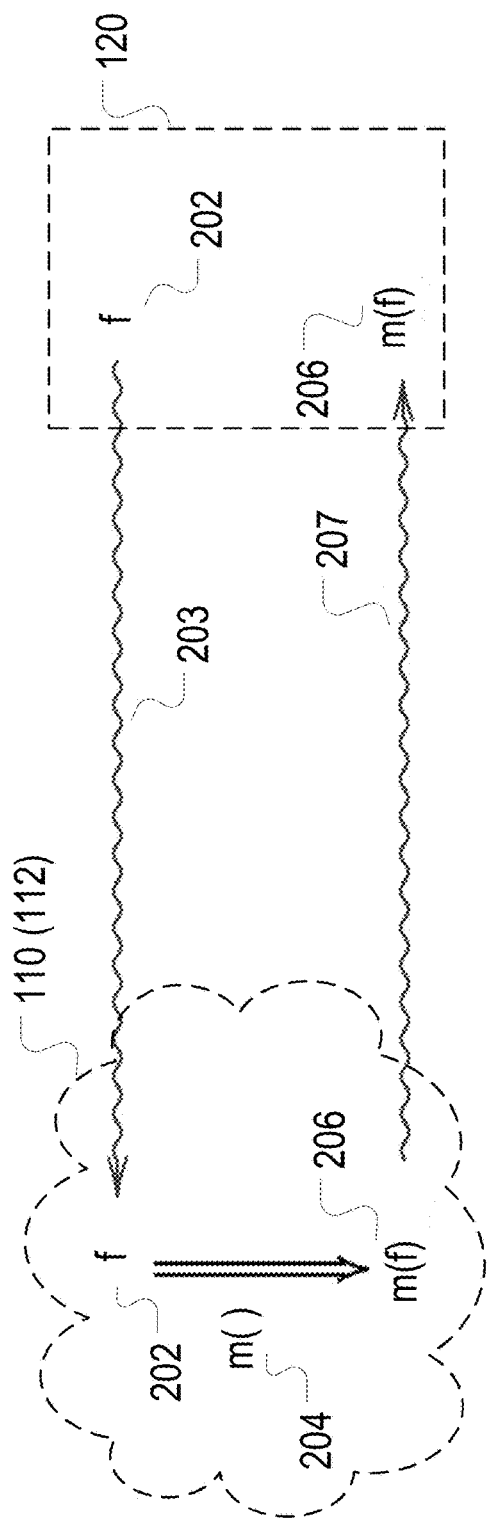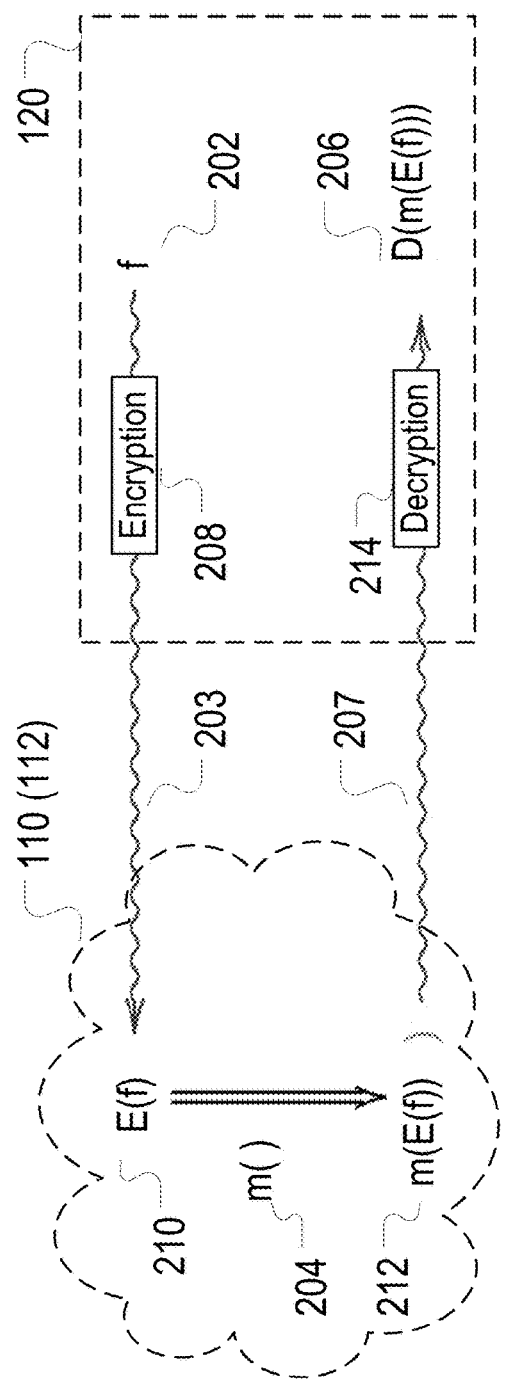
Figure 2a
Figure 2b

DISTRIBUTED AND COLLABORATIVE ANALYTICS OF ENCRYPTED DATA USING DEEP POLYNOMIAL NETWORKS

TECHNICAL FIELD

This disclosure relates generally to data analytics and specifically to speech recognition of encrypted data, as a real-time on-demand service.

BACKGROUND

Analytics of some data items may be based on complex data processing models (such as artificial intelligence models based on neural networks) that are more suitable for deployment in powerful and centrally managed remote backend servers. In addition, these models may require significant efforts to generate and the developers of these models may prefer centralized deployment rather than distributing these models to local terminal devices in order to avoid divulgence of their algorithms. Such data analytics thus may be provided as a remote on-demand service. For example, a local terminal device needing such a data analytics service may send data items to the remote backend servers via a communication network and then receive an outcome after the data analytics is performed by the remote backend servers. In some situations, the data items may be sensitive or confidential and may not be exposed in an unencrypted form to the communication network and/or the remote backend servers. Thus, for some secure applications, encryption of the data items may be necessary at the local terminal device before a request for data analytics service is sent to the remote backend servers. As a consequence, the data analytics models deployed in the remote backend servers may need to be configured to handle encrypted data items without having access to any decryption keys. Special data encryption/decryption algorithms for these data items that may provide near invariance of the data analytics models between encrypted and un-encrypted input data may be developed but would be very complex and require a large amount of time to execute in the local terminal device. Such special data encryption/decryption algorithms are thus impractical for many applications that require real-time or near real-time response to data analytics needs, including but not limited to conversational speech recognition applications.

SUMMARY

This disclosure is directed to a cloud-local joint or collaborative data analytics framework that provides data analytics models trained and hosted in backend servers for processing data items preprocessed and encrypted by remote terminal devices. The data analytics models are configured to generate encrypted output data items that are then communicated to the local terminal devices for decryption and post-processing. This framework functions without exposing decryption keys of the local terminal devices to the backend servers and the communication network between the local terminal devices and the backend servers. This framework thus provides privacy protection for user data in addition to providing protection to the data analytics models from piracy by deploying the modes in backend servers controlled by the model developers rather than terminal devices. The encryption/decryption and data analytics in the backend servers are configured to process and communicate data items efficiently to provide real-time or near real-time system response to requests for data analytics from the remote terminal devices. This framework may be applied, for example, to provide a remotely-hosted real-time on-demand speech recognition service.

In one implementation, a system for providing a remote data analytics is disclosed. The system includes a communication interface, a memory for storing a deep learning neural network, and a circuitry in communication with the communication interface and the memory. The circuitry may be configured to receive an encrypted data item from a remote terminal device via the communication interface; forward propagate the encrypted data item through the deep learning neural network in encrypted form to obtain an encrypted output data item; and send the encrypted output data item to the remote terminal device via the communication interface. The deep learning neural network is trained using un-encrypted training data and includes neurons interconnected into a plurality of layers, and wherein at least one activation operation and at least one pooling operation of the deep learning neural network are polynomialized.

In the implementation above, the remote data analytics includes a remote speech recognition service. In any one of the implementations above, the encrypted data item includes concatenated features of a frame of an audio waveform of a predetermined frame duration derived at the remote terminal device using a speech perception model followed by an encryption at the remote terminal device; the deep learning neural network includes an acoustic model for processing the concatenated features encrypted by the remote terminal device into the encrypted output data item; and the encrypted output data item of the deep learning neural network includes a probability vector corresponding to a phone codebook.

In any one of the implementations above, the at least one pooling operation is polynomialized using a scaled mean pooling. In any one of the implementations above, the at least one activation operation is polynomialized using a third-degree polynomial approximation of a sigmoid function. In any one of the implementations above, the encrypted data item may be based on public key encryption at the remote terminal device. In any one of the implementations above, at least a subset of model parameters of the deep learning neural network trained using un-encrypted training data remain un-encrypted for forward propagation of the encrypted data item.

In any one of the implementations above, the subset of model parameters include a plurality of weights and a plurality of batch normalization parameters. In any one of the implementations above, the subset of model parameters further include a plurality of convolutional kernels.

In any one of the implementations above, the deep learning neural network may be trained by initially training the deep learning neural network wherein a set of model parameters are trained to a first precision; and retraining the deep learning neural network by quantizing the set of model parameters to a second precision lower than the first precision during forward and backward propagation of training data.

In any one of the implementations above, quantization levels for the set of model parameters are determined by calculating a statistical distribution of the set of model parameters of the first precision such that denser quantized levels are assigned around values of the set of model parameters that are more concentrated. In any one of the implementations above, the first precision of the second precision are represented by a first predetermined number of parameter bits and a second predetermined number of parameter bits for the set of model parameters, respectively, and wherein the second predetermined number of parameter bits is 8.

In any one of the implementations above, the deep learning neural network includes a perception model followed by an acoustic model. The encrypted data item includes an encrypted frame of audio waveform of a predetermined frame duration sent from the remote terminal device. The perception model is configured to convert the encrypted frame of audio waveform into perception features. The acoustic model is configured to transform the perception features into the encrypted output data item comprising a probability vector corresponding to a phone codebook of the deep learning neural network.

In any one of the implementations above, the deep learning neural network includes an acoustic model followed by a language model. The encrypted data item includes encrypted perception features of a plurality of frames of audio waveform each of a predetermined frame duration sent from the remote terminal device. The acoustic model is configured to transform the encrypted data item into a plurality of encrypted probability vectors corresponding to a phone codebook, each encrypted probability vector corresponding to one of the plurality of frames of audio waveform. The language model is configured to transform the plurality of encrypted probability vectors into the encrypted output data item comprising an encrypted text segment.

In any one of the implementations above, the deep learning neural network includes a perception model followed by an acoustic model followed by a language model. The encrypted data item includes a plurality of encrypted frames of audio waveform each of a predetermined frame duration sent from the remote terminal device. The perception model is configured to convert the plurality of encrypted frames of audio waveform into a plurality sets of perception features. The acoustic model is configured to transform the plurality of sets of perception features into a plurality of encrypted probability vectors corresponding to a phone codebook, each encrypted probability vector corresponding to one of the plurality of frames of audio waveform. The language model is configured to transform the plurality of encrypted probability vectors into the encrypted output data item comprising an encrypted text segment.

In another implementation, a system for providing a remote data analytics is provided. The system includes a terminal device and a remote server. The remote server includes a communication interface, a memory for storing a deep learning neural network, and a circuitry in communication with the communication interface and the memory. The terminal device and the circuitry of the remote server is configured to encrypt, by the terminal device, a data item to obtain an encrypted data item; send, by the terminal device, an encrypted data item, to the communication interface of the remote server; receive, by the circuitry, the encrypted data item from the terminal device via the communication interface; forward propagate, by the circuitry, the encrypted data item through the deep learning neural network in encrypted form to obtain an encrypted output data item; send, by the circuitry, the encrypted output data item to the terminal device via the communication interface; receive, by the terminal device, the encrypted output data item from the remote server; and decrypt, by the terminal device, the encrypted output data item to obtain a decrypted data item. The deep learning neural network is trained using un-encrypted training data and includes neurons interconnected into a plurality of layers, and wherein at least one activation operation and at least one pooling operation of the deep learning neural network are polynomialized.

In the implementation above, the remote data analytics includes a remote speech recognition service. The encrypted data item includes concatenated features of a frame of an audio waveform of a predetermined frame duration derived at the terminal device using a speech perception model followed by an encryption at the terminal device. The deep learning neural network includes an acoustic model for processing the concatenated features encrypted by the terminal device into the encrypted output data item. The encrypted output data item of the deep learning neural network includes a probability vector corresponding to a phone codebook.

In any one of the system implementations above, at least a subset of model parameters of the deep learning neural network trained using un-encrypted training data remain un-encrypted for forward propagation of the encrypted data item.

In yet another implementation, a method is disclosed for providing a remote data analytics performed by a server comprising a communication interface, a memory for storing a deep learning neural network, and a circuitry in communication with the communication interface and the memory. The method includes receiving, by the circuitry, an encrypted data item from a remote terminal device via the communication interface; forward propagating, by the circuitry, the encrypted data item through the deep learning neural network in encrypted form to obtain an encrypted output data item; and sending, by the circuitry, the encrypted output data item to the remote terminal device via the communication interface. The deep learning neural network is trained using un-encrypted training data and includes neurons interconnected into a plurality of layers, and wherein at least one activation operation and at least one pooling operation of the deep learning neural network are polynomialized.

BRIEF DESCRIPTION OF THE DRAWINGS

FIGS. 2a-2b illustrate various implementations of the system of FIG. 1 for providing a data analytics service.

DETAILED DESCRIPTION

Figure 1:
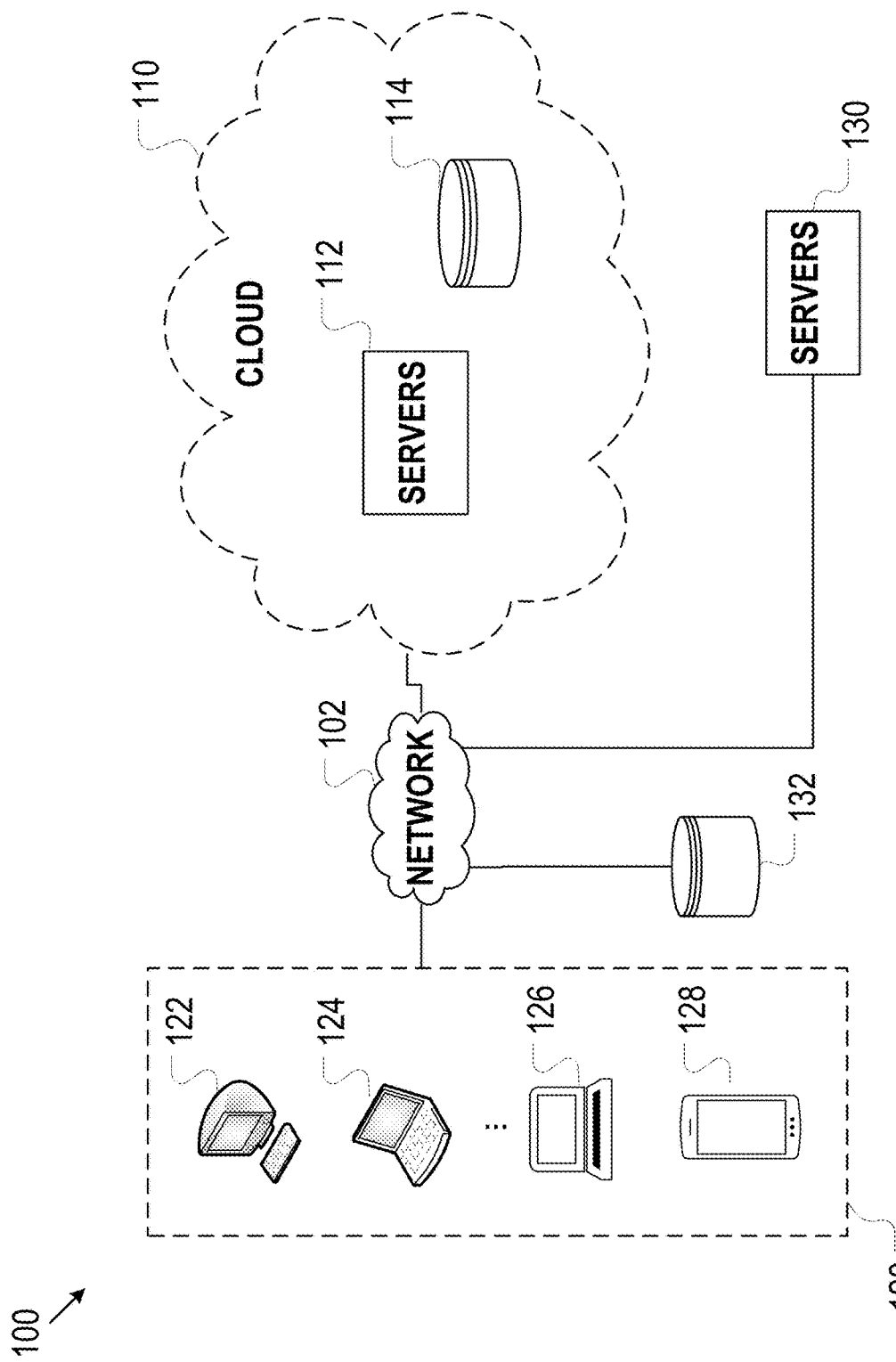
FIG. 1 illustrates an example system for providing a remote data analytics service.

Analytics of complex data may rely on data processing pipelines that require intensive computing power and large memory space. Such data processing pipelines may include various types of data processing components and data processing models, and may be hosted in backend servers to remotely serve local terminal devices. In particular, these data processing pipelines may be hosted in the backend servers in a form of virtual machines drawing upon virtual computing resources distributed in cloud platforms. A local terminal device needing such a data analytics service may send a data item along with a request to process the data item to the remote backend servers via a communication network and then receive an outcome after the requested data analytics is performed by the remote backend servers.

In many secure applications, data items needing a data analytics service may be sensitive or confidential, and may not be exposed in an unencrypted form to the communication network and/or the remote backend servers. For these applications, encryption of the data items may be necessary before they leave the local terminal device and before the request for the data analytics service is sent to the remote backend servers. For security purposes, the backend servers may be provided with encrypted data items without access to decryption keys, and thus would have to provide the data analytics service by processing the data items in an encrypted form. As such, the data processing components and data processing models included in a data analytics pipeline hosted in the backend server may need to be capable of handling encrypted data.

This disclosure is directed to a cloud-local joint or collaborative data analytics framework that provides data analytics models trained and hosted in backend servers for processing data items preprocessed and encrypted by remote terminal devices. The data analytics models hosted in the backend servers generate encrypted output data items that are then communicated to the local terminal devices requesting the data analytics service for decryption and post-processing. The framework disclosed herein functions without exposing secrete decryption keys of the local terminal devices to the backend servers and the communication network between the local terminal devices and the backend servers. The framework disclosed herein thus provides data privacy protection. The encryption/decryption and data analytics in the backend are configured to process and communicate data items efficiently to provide real-time or near real-time system response to requests for data analytics from the remote terminal devices.

Further, the data analytics models hosed in the backend servers and the operation and their training of these data analytics models are adapted and modified such that they can process data items in encrypted form. The same data analytics models may be used to provide services to different clients each having their own decryption keys. The framework and data analytics models may be used to provide a remote on-demand speech-recognition service and other types of data analytics services.

FIG. 1 illustrates an example system 100 for providing a remote data analytics service. System 100 includes backend servers 112 deployed in a cloud platform 110, and remote terminal devices 120. The backend servers 112 and the remote terminal devices are connected via public or private communication network 102. Example cloud platforms suitable for deploying the backend servers 112 include but are not limited to AWSTM of Amazon, Google Could, and Azure™ of Microsoft. While a single cloud platform 110 is shown in FIG. 1, the backend servers may be deployed across multiple cloud platforms. As further shown in FIG. 1, the backend servers may alternatively be deployed as dedicated servers 130 rather than as virtual machines in one or more cloud platforms. The dedicated servers 130, likewise, are connected to the remote terminal devices 120 via public or private communication network 102.

System 100 further includes cloud-based repositories or databases 114 and/or non-cloud-based repositories or databases 132 connected to the communication network 102 for storing various data analytics models and various input data items, intermediate date items, and final data items processed by the data analytics models and pipelines. The terminal devices 120 may include but are not limited to desktop computers, laptop computers, tablet computers, mobile phones, personal digital assistants, wearable devices, and the like, as illustrated by terminal devices 122, 124, 126, and 128. The communication network 102 may include any combination of, for example, wired networks, wireless networks, access networks, and core networks with a stack of network protocols configured to transmit and receive data.

FIGS. 2a-2b further illustrate several exemplary implementations for providing remote data analytics service to a terminal device 120 from the backend servers 112 deployed in cloud 110. As shown in FIG. 2a, a data item prepared or preprocessed at the terminal device 120 for further data analytics by the backend servers 112 is represented by f. The data item may be communicated to the backend server 112, as indicated by arrow 203. Data analytics performed by the backend server may be represented by m( ), as shown by 204. As such, the output data item after data analytics performed by the backend server 112 may be represented by m(f), as shown by 206. The processed data item m(f) may then be transmitted by the backend servers 112 to the terminal device 120, as shown by the arrow 207. The terminal device 120 may further post process the data item m(f) as specified by the application requesting the remote data analytics service in the terminal device 120 (not shown in FIG. 2a).

In many applications involving, for example, medical, financial, enterprise, or other private data that are sensitive and confidential, providing data analytics service following the implementation of FIG. 2a may not be safe. Specifically, in the data transmission and communication scheme illustrated in FIG. 2a, the data item f, in its unencrypted form, is exposed to potentially untrusted communication channel 203 as well as the backend server 112. Likewise, the processed data item m(f), in its unencrypted form, is further exposed to the untrusted communication channel 207. Integrity of the data items f and m(f) may thus be compromised.

FIG. 2b illustrates an implementation modified from FIG. 2a for adding protection to the data items f and m(f). As shown in FIG. 2b, the data item f, prior to being sent by the terminal device 120 to the backend server 112 for data analytics service, is first encrypted by the terminal device 120, as indicated by 208. The encryption function performed by the terminal device 120 may be represented by E( ). As such, the encrypted data item represented by E(f) (210), rather than f, may be transmitted by the terminal device 120 to the backend servers 112. Decryption keys may be kept secret by the terminal device 120 and may not be exposed to the communication channels 203 and 207, and the backend servers 112. The backend servers 112 may then process the encrypted data item E(f) 210 using the data analytics processing function m( ) as shown by 204, to obtain a processed data item m(E(f)), as indicated by 212. The processed data item m(E(f)) 212 may then be transmitted from the backend servers 112 to the remote terminal device 120. Upon receiving the processed data item m(E(f)) 212, the terminal device 120 may then perform a decryption D( ), as shown by 214, to obtain a decrypted data item D(m(E(f))), as shown by 206, prior to post-processing (not shown in FIG. 2b).

In the implementation of FIG. 2b, because the backend servers 112 do not have access to the secret decryption keys of any of its clients, the data analytics function m( ) is usually developed for processing unencrypted rather and encrypted data items. In order for the implementation of FIG. 2b to function successfully when processing encrypted data items using the same data analytics function m( ) the decryption process 214 of FIG. 2b needs to recover or nearly recover a data item that would be generated if the unencrypted input data item were to be processed directly by the data analytics function m( ). This is shown in FIG. 3, where the decryption outcome at the terminal device 120, D(m(E(f))), restores to m(f) (FIG. 3 is otherwise identical to FIG. 2b).

Figure 3:
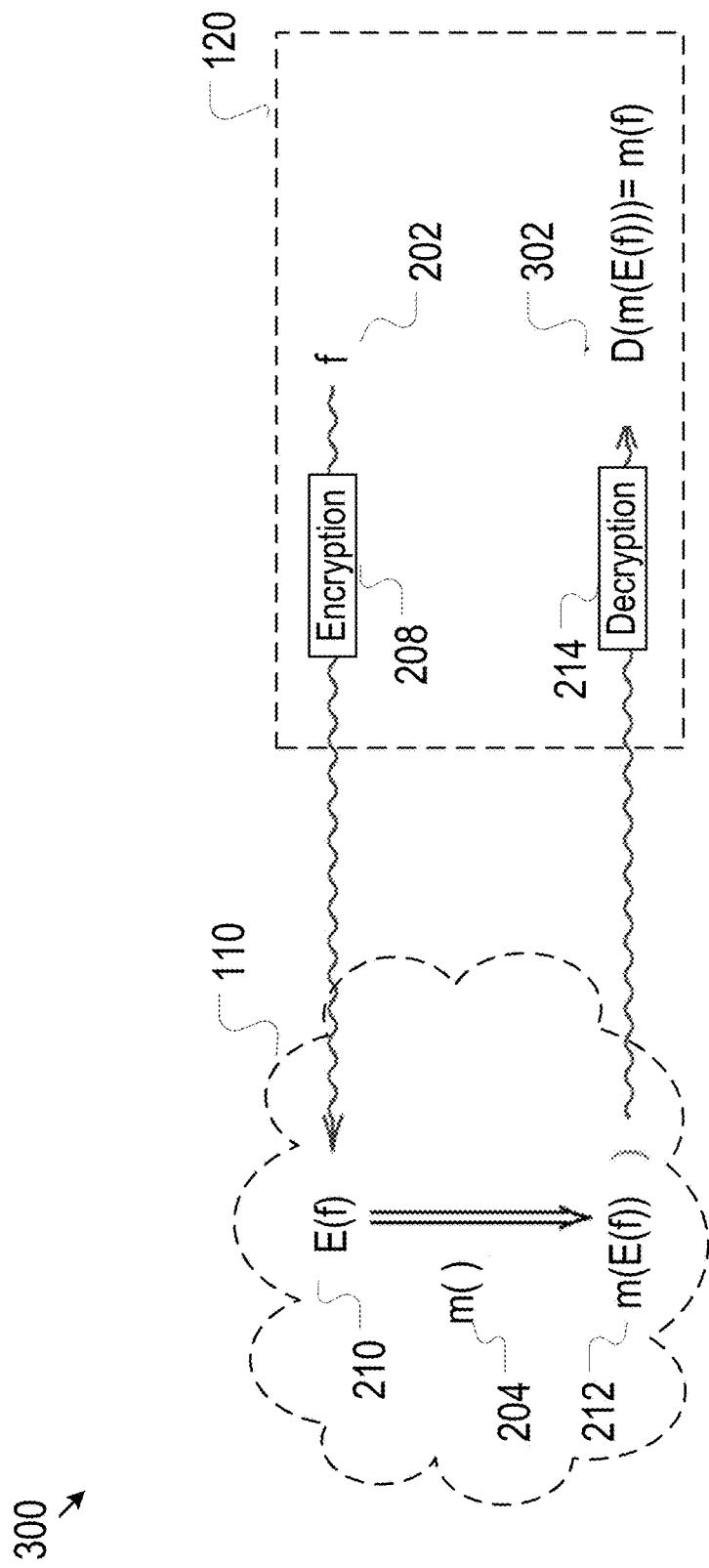
FIG. 3 illustrates an example implementation for providing a distributed and collaborative data analytics of encrypted data items.

To achieve D(m(E(f)))=m(f) for any data analytics function m( ) using the scheme of FIGS. 2b and 3, the encryption and decryption algorithms E( ) and D( ) may need to be implemented in some special and untraditional manners. Specifically, traditional encryption schemes lock data down in a way that makes it difficult if not impossible to satisfy the above condition without being decrypted at the backend servers 120 first. An untraditional encryption process that satisfies the condition above may be referred to as homomorphic encryption (HE). An HE process may be designed to allow computation and processing of data items in their encrypted form. Decryption may be performed after the computation and processing of the encrypted data items, and the decrypted output of the processed encrypted data items would be the same as an output of the same computation and processing m( ) performed on the corresponding unencrypted data items. Such type of encryption is referred to as homomorphic because the data computation and processing (alternatively referred to as data transformation) has the same effect on the unencrypted and encrypted data items. Fully homomorphic encryption schemes may be complex and may require computation resources that are not practical for terminal devices and my further require computation time unsuitable for applications requiring a real-time response.

Some encryption algorithms may be partially homomorphic in that some types of data transformation (function m( ) above) as opposed to arbitrary data processing operations, have the same effect on the unencrypted and encrypted data items. For example, an encryption algorithm may include multiplying an input numbers by 10 and the corresponding reversing decryption algorithm may include division by 10. This encryption is homomorphic for simple data transformation operation of addition. For example, unencrypted numerical data "1" and "2" may be encrypted under this particular encryption algorithm to "10" and "20" (multiplication by 10), respectively. A data transformation m( ) of simple addition would produce numerical data "3" when being used to process the unencrypted data, and numerical data "30" when being used to process the encrypted data. The encrypted output data "30" would be decrypted to "3" (division by 10), identical to the outcome of performing the data transformation directly on the unencrypted data.

As such, in some implementations of the present disclosure, an efficient encryption algorithm that is not fully homomorphic may be used in conjunction with a data analytics only containing a combination of data processing operations limited to a set of operations that effectively render the encryption algorithm homomorphic. A data analytics pipeline containing data processing operations that are not within the set of operations may be approximated or modified to only include data processing operations from the set of operations and adaptively trained. With such modification to the data analytics pipeline, the encryption algorithm would be homomorphic.

Figure 4:
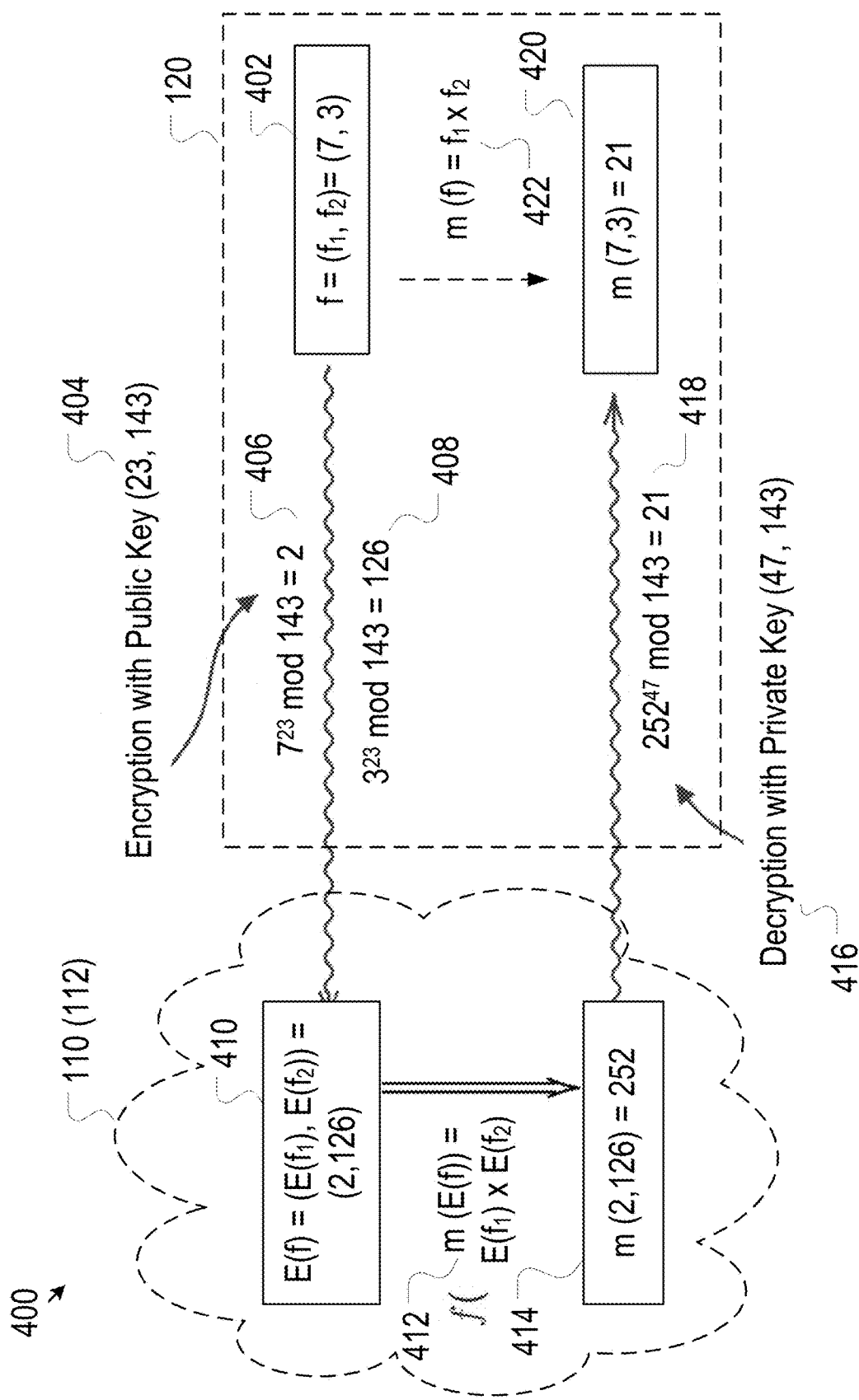
FIG. 4 illustrates an example implementation for providing a distributed and collaborative data analytics of data items encrypted using a specific encryption scheme.

FIG. 4 shows an example of using an efficient encryption algorithm that is homomorphic with respect to a single data analytics operation or data transformation operation m( ) involving simple multiplication. The encryption/decryption algorithm illustrated in FIG. 4 may be based on traditional RSA scheme for encryption using a public key and decryption using a private key (secrete key). In the example of FIG. 4, the public key may be (23, 143) and the private key may be (47, 143). The encryption algorithm may include performing a power function using the first component of the public key and then performing a Mod operation using the second component of the public key, as shown by 406 and 408. The decryption process may include performing a power function using the first component of the private key and then performing a Mod operation using the second component of the private key, as shown by 418. In the example of FIG. 4, the data item to be processed for the local terminal device 120 is vector $f=(f_1, f_2)=(7, 3)$. The data analytics function m( ) includes a simple multiplication of the components of the input data vector, $m(f)=f_1 \times f_2$, as shown by 422.

Continuing with FIG. 4, the local terminal device 120 first encrypts the data item $f=(f_1, f_2)=(7, 3)$ using the public key (as shown by 406 and 408), generates an encrypted vector $E(f)=(E(f_1), E(f_2))=(2, 126)$, and sends the encrypted vector to the backend servers 112 deployed in the cloud 110, as shown by 410. The backend servers 112 then performs the data analytics function m( ) to generate a processed data item $m(E(f))=E(f_1) \times E(f_2)=2 \times 126=252$, as shown by 412 and 414. The encrypted output 414 of the data analytics process 412 may then be communicated by the backend servers 112 to the remote terminal device 120, which is then decrypted by the remote terminal device 120, as shown by 416 and 418. In this example, the encrypted output 414 after decryption using the private key is "21", as shown by 418, identical to a result obtained by performing the data analytics operation m( ) directly on the unencrypted input data item f=(7, 3), as shown by 422 and 420.

In some other implementations, the data analytics operations may include a combination of multiplications and additions of input data items. In other words, the data analytics function m( ) may be a polynomial function of the input data items. An efficient homomorphic encryption/decryption algorithm may be designed for such a data analytics function. Particularly, an efficient homomorphic encryption/decryption algorithm may be developed for a low-degree polynomial data analytics function m( ). As will be shown in various examples below, for m( ) that is not a low-degree polynomial function, it may be adapted to approximate a combination of low-order polynomial functions. In other words, the data analytics function m( ) may be polynomialized. As a result, efficient homomorphic encryption/decryption algorithm may be available to such a modified or approximated data analytics function.

In a practical application, the data analytics function m( ) provided by the backend servers 112 to the terminal devices 120 of FIGS. 1-4 may be constructed to analyze complex input data items. For example, the backend servers 112 (and/or 130) may provide a speech recognition service to the terminal devices 120. Such a speech recognition service may be provide via speech-to-text Application Program Interface (API). Such an API may be used for a terminal device to request the backend servers to process encrypted data items (data item f of FIGS. 2-4) formatted or transformed from a digital audio waveform containing speech. The terminal devices 120 may further receive the processed data items from the backend servers via the API, decrypt the processed data items, and further post-process the decrypted data items to obtain text segments corresponding to the speech contained in the digital audio waveform. Based on the speech recognition service provided by the backend servers 112 using the API, powerful applications may be developed for the terminal devices 120, including but not limited to voice-based control, user dialog using natural speech conversion, speech transcription, and dictation.

While the further example implementations below are provided in the context of audio processing and speech recognition service, the underlying principles are applicable to other types of remote data analytics involving different types of data and different types of data processing, including but not limited to data classification (such as image classification and text classification), data clustering, object segmentation detection and recognition in digital images (e.g., face segmentation and recognition), and the like.

Figure 5:
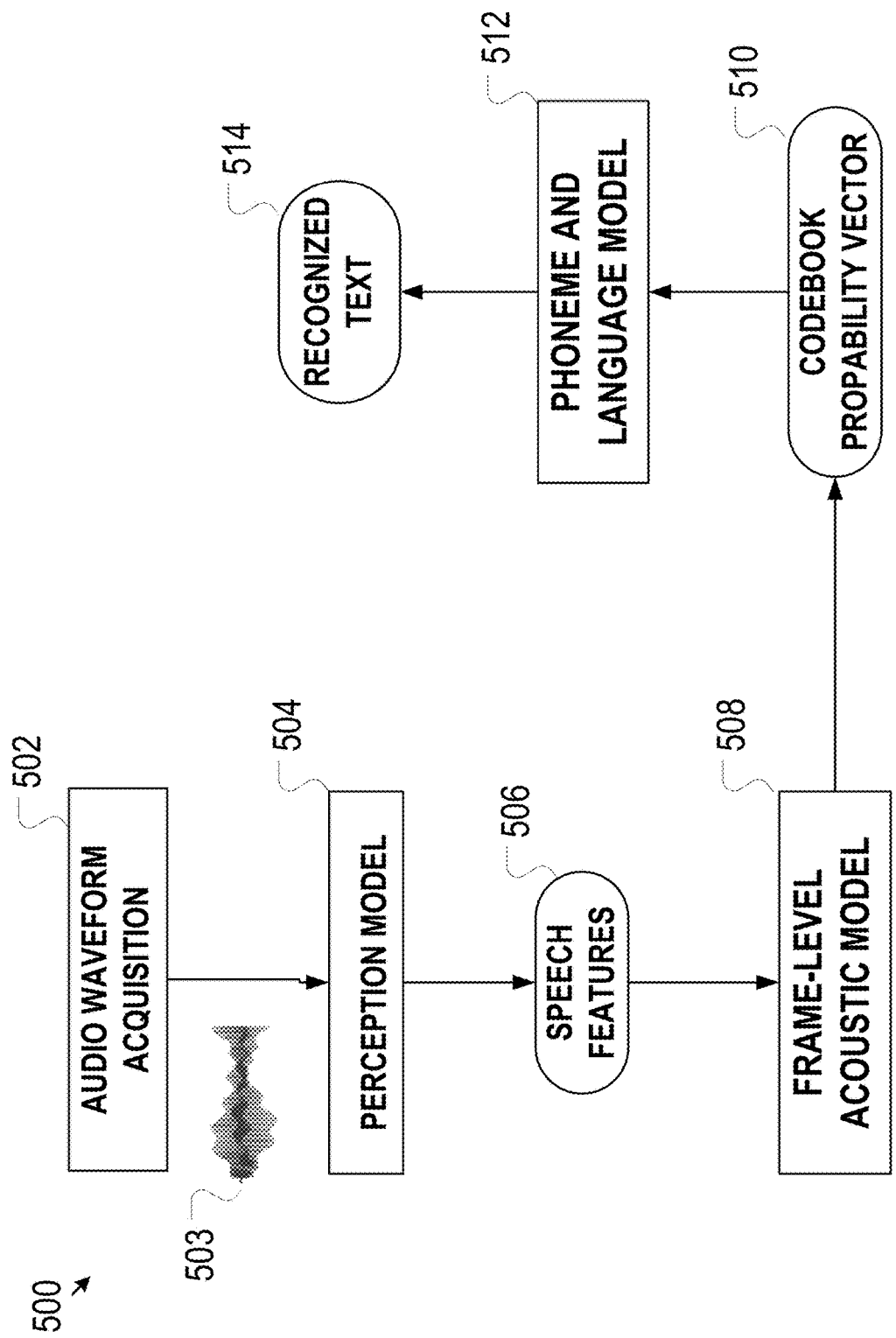
FIG. 5 illustrates an example data analytics pipeline for speech recognition of a digitized input audio waveform.

FIG. 5 shows an example data processing pipeline 500 for speech recognition. The data processing pipeline 500 includes audio waveform acquisition 502 for generating digitized audio waveform 503. The digital audio waveform 503 may be segmented into frames of a predetermined duration (e.g., 10-100 ms) and the audio frames are then processed by a perception model 504. The perception model 504 may be designed to convert the frames of the digital waveform 503 into speech features 506. The perception model, may be used to model physiology of human vocal cord and vocal cavity with a set of speech feature parameters. As such, the perception model is capable of transforming or coding a frame of digital audio containing speech (an audio frame) into a representation based on the set of speech feature parameters. For example, the perception model may be based on algebraic, relaxed, or low-delay code-excited linear prediction (CELP).

Continuing with FIG. 5, the speech features 506 may then be processed by an acoustic model 508 frame by frame to generate a probability vector representing probabilities that an audio frame contains each of a set of phone in a phone codebook. As will be described in more detail below, the acoustic model 508 may be based on a pre-trained deep-learning neural network. The codebook probability vectors 510 for a collection of consecutive audio frames may further be processed by a phoneme and language model 512 to generate recognized text 514 by detecting phoneme, word, and sentence contained in the collection of audio frames.

Depending on the application, the various processing models in FIG. 5 may be implemented and distributed in either the local terminal device 120 or in the backend servers 112 (or 130). As a result, portions of the speech recognition pipeline 500 may be implemented in the local terminal device 120 and the other portions of the pipeline 500 may be implemented in the remote servers 112 that may be hosted in a cloud platform, as shown in the exemplary implementations in FIGS. 6-9. In any of FIGS. 6-9, a data item generated by the local terminal device 120 before the encryption process is denoted as f; a data item generated after encryption by the local terminal device 120 is denoted as E(f); a data item generated by the backend servers 112 after processing E(f) is denoted as m(E(f)); and a data item after decryption by the local terminal device 120 is denoted as D(m(E(f))), as shown in FIGS. 6-9, consistent with the notations in FIGS. 2-4.

Figure 6:
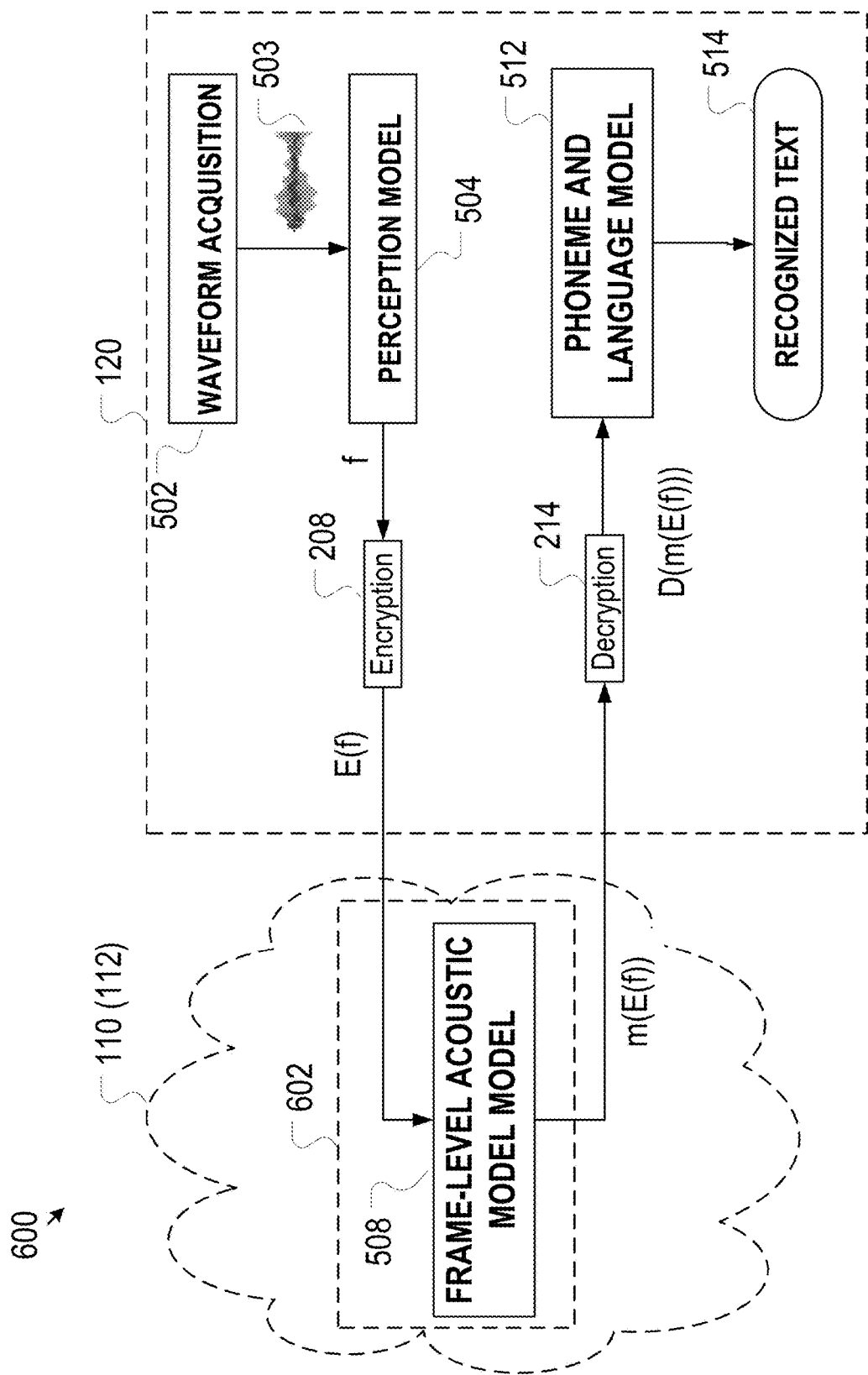
FIG. 6 illustrates an example implementation for providing a distributed and collaborative speech recognition of encrypted audio data items.

In one example implementation shown in FIG. 6, the acoustic model 508 may be provided as a service 602 by the backend servers 112, and the other models and data processing may be located at the local terminal device 120. In particularly, the local terminal device 120 may be configured to generate the digital audio waveform 503 by the acquisition process 502 and implement the perception model 504 to generate the speech features. The speech features may then be encrypted (208) and the encrypted speech features may then be communicated to the backend servers 112. The backend servers 112 then process the encrypted speech features using the acoustic model 508 to generated encrypted phone probability vector, which is then decrypted by the local terminal device 120 (214) followed by post-processing by the phoneme and language model 512 at the local terminal device 120 to generate the recognized text 514.

Figure 7:
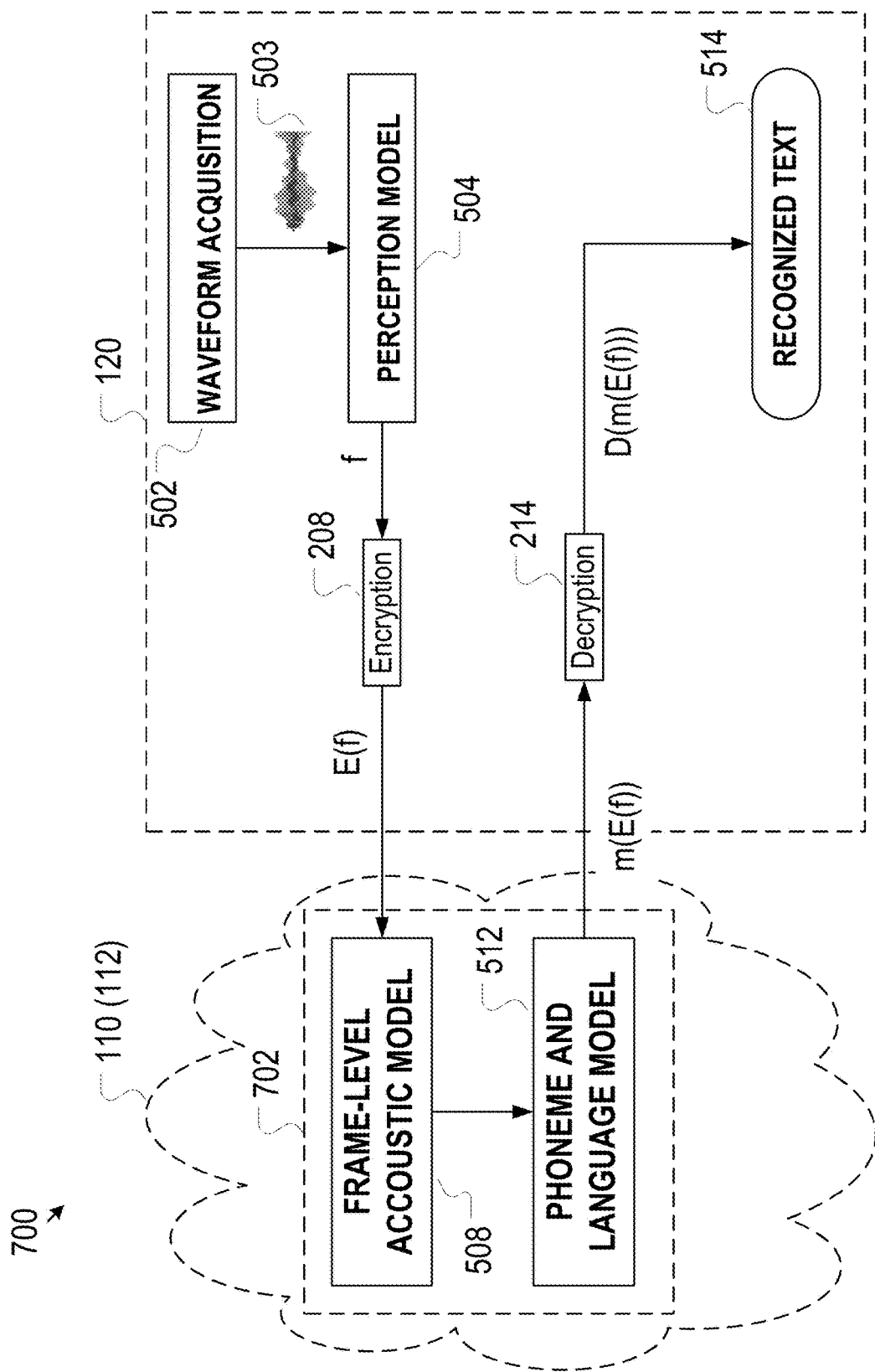
FIG. 7 illustrates another example implementation for providing a distributed and collaborative speech recognition of encrypted audio data items.

In another example implementation shown in FIG. 7, the acoustic model 508 and the phoneme and language model 512 may be provided as a service 702 by the backend servers 112, and the other models and data processing may be located at the local terminal device 120. In particularly, the local terminal device 120 may be configured to generate the digital audio waveform 503 by the acquisition process 502 and implement the perception model 504 to generate the speech features. The speech features may then be encrypted (208) and the encrypted speech features may then be communicated to the backend servers 112. The backend servers 112 then process the encrypted speech features using the acoustic model 508 to generated encrypted phone probability vector and process the encrypted phone probability vector using the phoneme and language model 512 to generate an encrypted text m(E(f)), which is then decrypted (214) by the local terminal device 120 to generate the recognized text 514.

Figure 8:
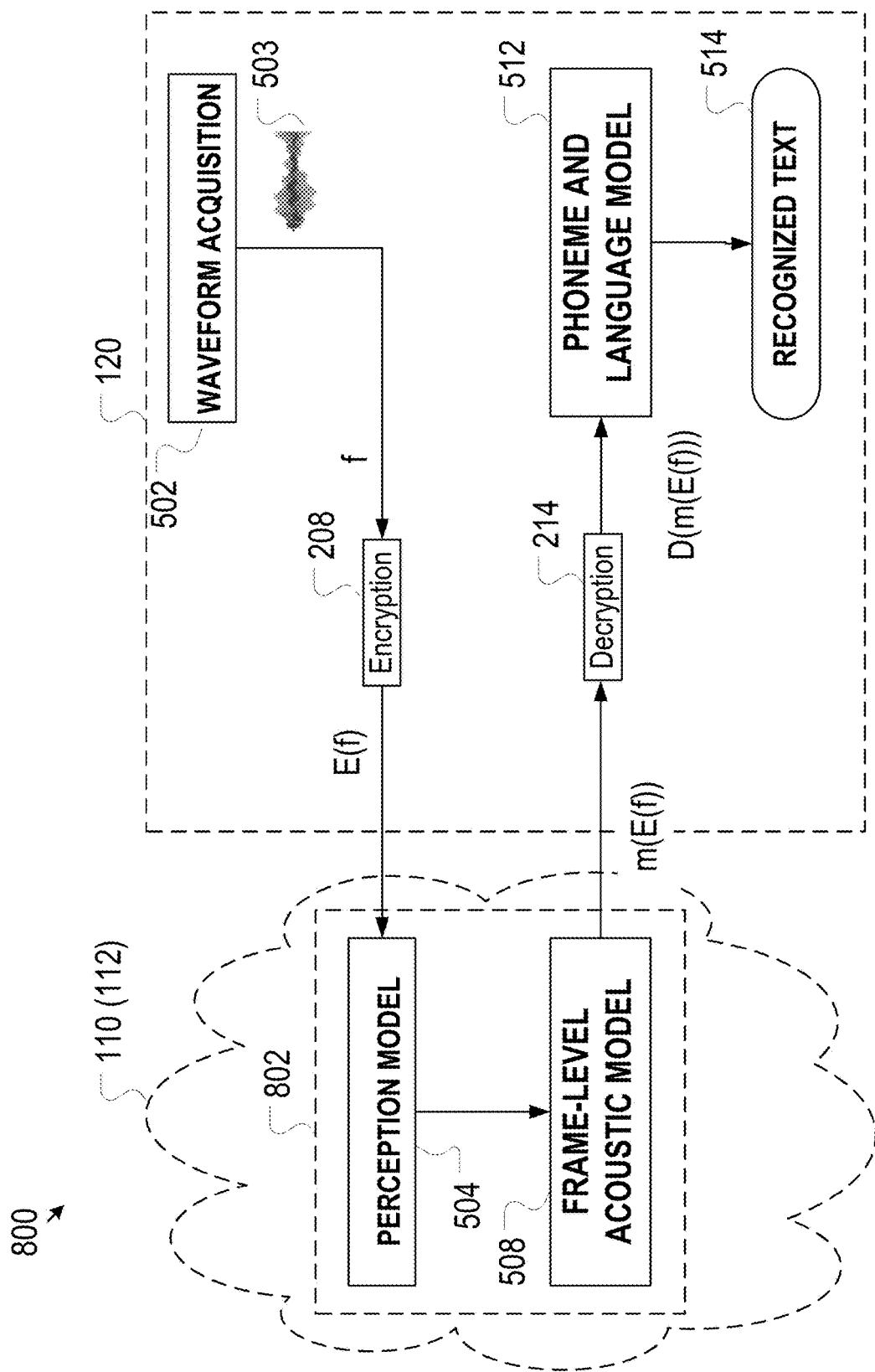
FIG. 8 illustrates another example implementation for providing a distributed and collaborative speech recognition of encrypted audio data items.

In another example implementation shown in FIG. 8, the perception model 504 and the acoustic model 508 may be provided as a service 802 by the backend servers 112, and the other models and data processing may be located at the local terminal device 120. In particularly, the local terminal device 120 may be configured to generate digital audio waveform 503 using the acquisition process 502. The local terminal device 120 may further encrypt frames of the digital waveform (208) to generate encrypted digital audio waveforms. The encrypted digital audio waveforms may then be communicated to the backend servers 112. The backend servers 112 then process the encrypted digital audio waveforms using the perception model 504 to generate encrypted speech features, which are then processed by the acoustic model 508 to generated encrypted phoneme codebook probability vectors m(E(f)). The phoneme codebook probability vectors may then be decrypted (214) by the local terminal device to generate decrypted phoneme codebook probability vectors. The decrypted phoneme codebook probability vectors may then be post-processed by the phoneme and language model 512 at the local terminal device to generate the recognized text 514.

Figure 9:
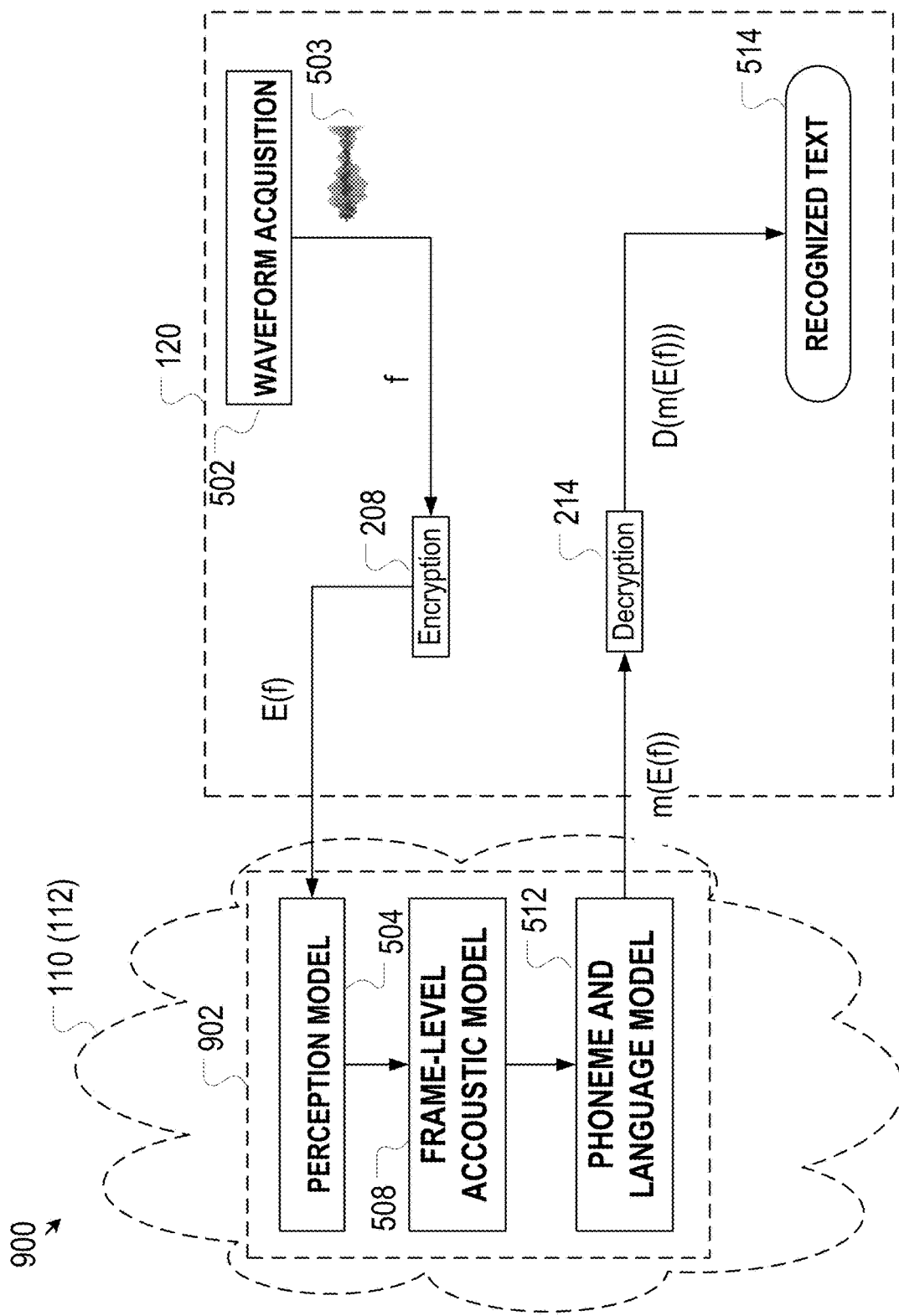
FIG. 9 illustrates yet another example implementation for providing a distributed and collaborative speech recognition of encrypted audio data items.

In yet another example implementation shown in FIG. 9, the perception model 504, the acoustic model 508, and the phoneme and language model 512 may all be provided as a service 902 by the backend servers 112, and the other models and data processing may be located at the local terminal device 120. In particularly, the local terminal device 120 may be configured to generate digital audio waveform 503 using the acquisition process 502. The local terminal device 120 may further encrypt frames of the digital waveform (208) to generate an encrypted digital audio waveform E(f). The encrypted digital audio waveform may then be communicated to the backend servers 112. The backend servers 112 then process the encrypted digital audio waveform using the perception model 504 to generate encrypted speech features, which are then processed by the acoustic model 508 to generated encrypted phoneme codebook probability vectors. The phoneme codebook probability vectors may then be processed by the phoneme and language model 512 device to generate an encrypted text. The encrypted text may then be communicated to the local terminal device for decryption (214) to generate unencrypted and recognized text 514.

In the implementations in FIGS. 6-9, the data processing models included in the backend servers for providing services 602, 702, 802 and 902 may be polynomialized to low-degree polynomial operations such that the encryption and decryption schemes such as the one described in FIG. 4 become homomorphic with respect to services 602, 702, 802 and 902. The examples below focus on the implementation 600 illustrated in FIG. 6 in which the acoustic model 508 alone is hosted in the backend servers 112 and the rest of the data processing needed for a speech recognition application is performed at the local terminal device 120. The underlying principles for establishing and training the data analytics model or models hosted in the backend servers 112 are applicable to the other implementations and schemes of FIGS. 7-9 in distributing the data processing models between the backend servers 112 and the remoter terminal device 120.

In some implementations, the acoustic model 508 of FIG. 6 may be based on a deep-learning neural network. For example, the acoustic model may include a deep learning convolutional neural network (CNN) having multiple cascading convolutional, pooling, rectifying, and/or fully connected layers of neurons, with a large number of kernel, weight, bias, and other parameters. These model parameters may be determined by training the CNN using a sufficient collection of pre-labeled input data. In an exemplary training process of a CNN model, each of a large number of labeled training datasets may be forward propagated through the layers of neurons of the CNN network with predetermined inter-connectivity and training parameters to calculate an end labeling loss or error. Back propagation may then be performed in an opposite direction through the layers of the interconnecting neurons while adjusting the training parameters to reduce labeling loss based on gradient descent. The forward and back propagation training process for all training datasets iterates until the neural network produces a set of training parameters that provide converging minimal overall loss for the labels predicted by the neural network over the labels pre-associated with the training datasets. A converged model may then include a final set of training parameters and neural connectivity.

The deep-learning CNN above may be architected to function as an acoustic model 508 to process the speech features generated by the perception model 504 and encrypted by the encryption process 208 of FIG. 6. The fully connected layer, for example, may include a phone codebook having a predetermined number of components. The phone codebook may contain N components representing the most common phones that may be found in human speech. For example, the number of phone components N in the phone codebook may be 100-10,000, or may be any other number. These components may be fully connected to a previous layer of the neural network. Such a deep-learning neural network, once trained, may be used to process encrypted speech features of an input audio frame to generate a probability vector having N components, each representing a probability that the input audio frame contains the corresponding phone component.

Figure 10:
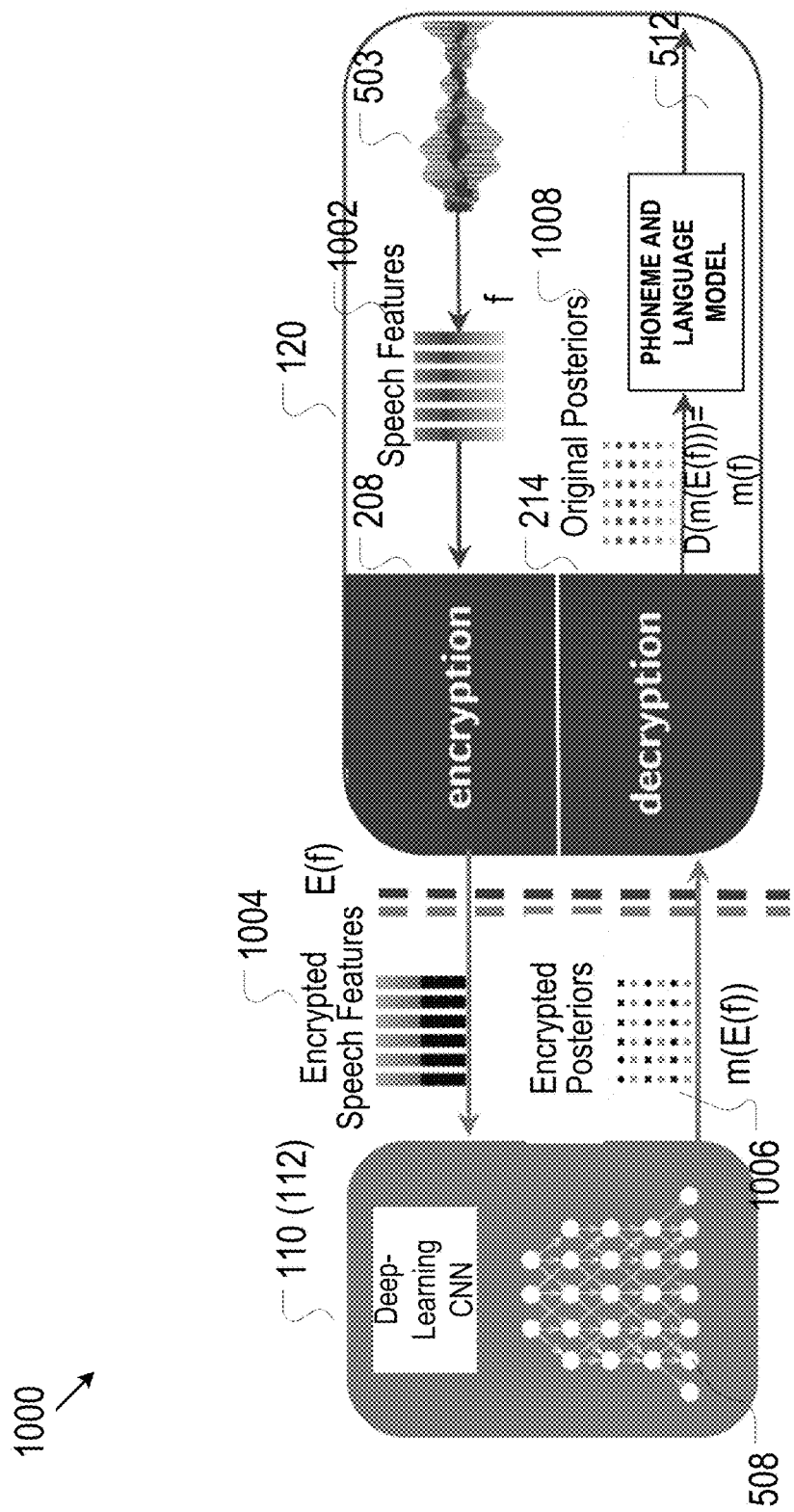
FIG. 10 illustrates a more detailed implementation of the distributed and collaborative speech recognition process of FIG. 6 showing a deep-learning neural networks deployed in the backend server.

FIG. 10 further illustrates the implementation of FIG. 6 with the acoustic model 508 hosted in the backend servers 112 and being implemented as the deep-learning neural network described above. In particular, frames of digital audio waveform 503 is processed into speech features 1002 at the local terminal device 120. The speech features 1002 is then encrypted by the encryption process 208 in the local terminal device 120 to generate the encrypted speech features 1004, which are then processed in the backend servers 112 using the deep-learning neural network 508 to generate the encrypted phone probability vector, also referred to as encrypted posteriors 1006 in FIG. 10. The encrypted posteriors 1006 is then decrypted by the decryption process 214 at the local terminal device 120 to generate the decrypted phone probability vector 1008, which, for a homomorphic encryption and decryption process (with respect to the data operations included in the deep-learning neural network 508), would correspond to original posterior that would have been obtained if the original speech features are processed by the deep-learning neural network 508 in an unencrypted form.

Traditional multilayer neural networks may include data processing operations that are not low-degree polynomial functions. For example, typical neuron activation functions, such as a sigmoid function, are non-polynomial. For another example, max pooling operation following a convolution operation is also non-polynomial. As such, a typical multilayer deep-learning neural network may be modified or polynomialized to low-degree polynomials in order to maintain a homomorphicity for the encryption/decryption algorithm of FIG. 10. Such modified deep-learning neural network may be trained and used as the acoustic model 508 for processing the encrypted speech features 1004 in FIG. 10. The modified deep-learning neural network may be referred to as deep polynomial network (DPN) or deep-learning polynomial network.

Figure 11:
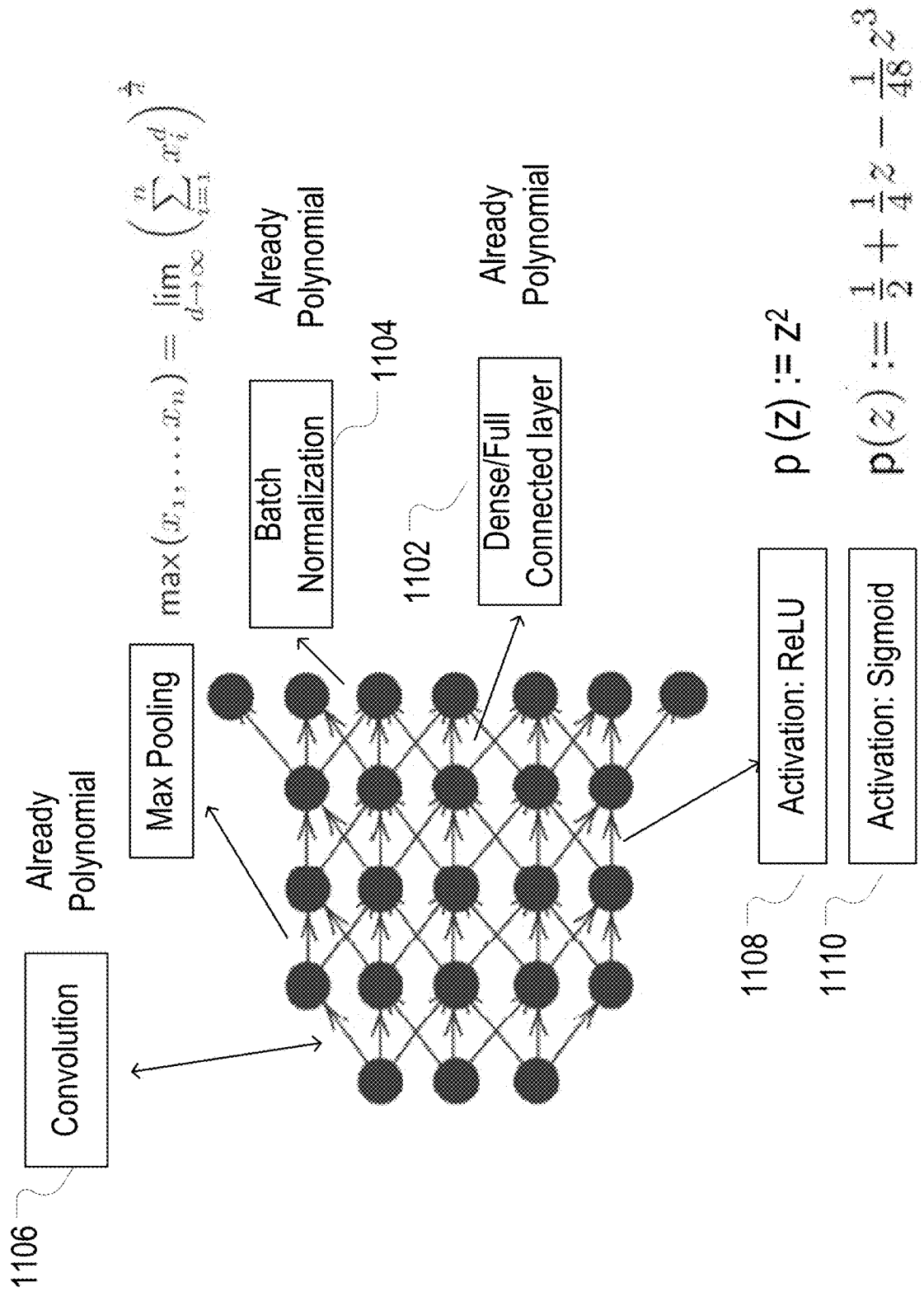
FIG. 11 illustrates polynomialization of a traditional deep-leaning neural network for speech recognition.

Exemplary modifications of various layers of a typical deep-learning neural network to include only low-degree polynomial operations are shown in FIG. 11 and described in more detail below. For example, a dense layer such as the fully connected layer of the deep-learning neural network may include just linear multiplication and addition and therefore only contain low-degree polynomial functions. It can thus be directly implemented without modification for homomorphic encryption, as shown by 1102 of FIG. 11.

Batch normalization layers of a deep-learning neural network also only involve multiplications and additions, e.g., $$BN(x) = \gamma \frac{x-\mu}{\sigma} + \beta$$

(where $\gamma$, $\mu$, $\sigma$, and $\beta$ are batch normalization parameters), which can be directly implemented for homomorphic encryption without low-degree polynomial approximation, as shown by 1104 of FIG. 11.

Convolution operations in convolutional layers of a deep-learning CNN essentially involve dot products of weight vectors (or kernels) and outputs of feeding layers. As such, the convolution operations also involve only multiplication and addition and do not need additional polynomial approximation, as shown by 1106 of FIG. 11.

Typical activation functions used in a deep-learning neural network, however, are usually non-polynomial and may nevertheless be approximated by low-degree polynomial functions. For example, a ReLU (Rectifying Linear Unit) function, $z \rightarrow \max(0, z)$, used in rectification layers of a deep-learning neural network, may be approximated by a low-degree polynomial function, $p(z):=z^2$, as shown by 1108 of FIG. 11. For another example, the sigmoid activation function, $$z \rightarrow \frac{1}{1+\exp(-z)}$$

may be approximated with low-degree polynomials $p(z)$: $=\frac{1}{2}+z/4-z^3/48$, as shown by 1110 of FIG. 11.

Pooling operations in pooling layers of the deep-learning neural network (deep-learning CNN in particular) are usually non-polynomial and may be approximated by low-degree polynomial functions. For example, max pooling is non-polynomial but may be approximated using max $$(z_1, \ldots, z_n) = \lim_{d \rightarrow \infty} (\Sigma_{i=0}^n z_i^d)^{1/d}.$$

For simplicity, parameter d may be set as "1" and the max pooling function above thus may be approximated by a scaled mean pooling that is a first-degree polynomial operation.

Those of ordinary skill in the art understand that the low-degree polynomial approximations above are merely example, other polynomial approximations are also contemplated.

The modified deep-learning neural network, or the deep polynomial network (DPN) above may be trained and tested using a labeled training dataset and a labeled test dataset. In some implementations, the training may be performed using unencrypted speech data. Training with unencrypted data is advantageous particularly in the context that the acoustic model embodied in the deep polynomial network may be provided as a service to many different clients having different public encryption keys. This is because if the training process were to be performed on encrypted data, multiple encrypted version of the training dataset would be generated based on public keys of all potential clients, and used to separately train multiple versions of the DPN. By using unencrypted training data, a single version of the DPN may be trained and used for all clients.

During the training process, various training parameters may not need to be encrypted. As such, the trained deep polynomial model may include the network connectivity and model parameters (weights, bias, kernels, and the like) that are unencrypted. Again, maintaining the model parameters in unencrypted scheme during training avoids having to prepare client-specific models. Further, when the trained polynomial network is used to process encrypted speech features from a remote terminal device of a particular client (associated with a particular public key), the forward propagation through some or all of the layers of the polynomial network may be performed by keeping one or more model parameters of these layers unencrypted. For example, weight parameters W in dense layer (fully connected output layer) of the deep-learning neural network may be unencrypted during forward propagation for the data analytics service. Given encrypted inputs to the polynomial network, a naive way to compute forward propagation in dense layers is to first encrypt the weight parameters using the public key of the client and then perform the forward propagation through the dense layer in encrypted domain $E(W)^T E(x)$ (where $E(x)$ is the output of the previous layer), so that after decryption by the remote terminal device, the exact value of $W^T x$ can be obtained. However, this process may be computationally intensive and unnecessary. Instead, a more efficient operation $W^T E(x)$ may be used in the forward propagation through the dense layer without encrypting the weight parameters. Similarly, for batch normalization, the parameters batch normalization parameters $\gamma$, $\mu$, $\sigma$, and $\beta$ above may not need to be encrypted when the trained polynomial network is used to process input speech features for a particular client. In some implementations, these batch normalization parameters may be merged with the preceding dense layer to provide modified weight parameters $W^{new}=\text{diag}(\gamma/\sigma)W$, and modified bias $b^{new}=b+W^T\beta-W^T(\mu\cdot\gamma/\sigma)$ for the dense layer.

The encryption described above may be homomorphic with respect to the deep polynomial network (additions and multiplications). However, the speed of encryption and decryption will be significantly affected by the degree of the deep polynomial network. To achieve higher calculation speed, it may be desirable to configure the deep polynomial network to operate on low-bit fixed-precision. Otherwise, the homomorphic encryption and decryption will be extremely slow and unsuitable for real-time application such as conversational speech recognition when the system is operated on floating-point numbers. A typical training process of a neural network in, for example, GPUs, uses a 32-bit or higher floating-point precision for the training parameters and floating-point calculations for forward propagation and back propagation. A deep polynomial network model trained and operated in 32-bit or higher floating-point precision will significantly increase the encryption and decryption time required. On the other hand, applying low-bit fixed-point post-training quantization to high precision model parameters of a deep polynomial model trained using floating-point calculations, and then using such a quantized deep polynomial network model to process an input data item using fixed-point calculation could cause substantial performance drop, as the training process was not adapted for lower-precision model parameters and fixed-point calculations.

In some implementations, rather than post-training quantization, the training process of a deep polynomial network model may be restricted to fixed-point calculations and the model parameters of the deep-learning polynomial model may be restricted to fixed-point precision during training. However, such implementations may not count for uneven statistical distribution of values of the model parameters. For example, weight parameter values of, e.g., 8-bit fixed-point precision, may be concentrated in a small portion of the 8-bit value range for a model parameter, yet a training processing based on fixed-point calculations would rely on a uniform value resolution across the 8-bit value range of the parameter space. The crowded portion of the 8-bit value range would be provided with the same data resolution as the other portions of the 8-bit value range with sparser parameter occupation. Such a problem would be less of an issue when the deep polynomial network is trained under a floating-point precision (with, e.g., 32-bit rather than 8-bit precision) because even though the training process based on floating-point calculations also uses uniform data resolution across the parameter value range, the crowded portion of the value range would nevertheless have enough resolution/precision for yielding a reasonably accurate model due to the large overall number of bits available in floating-point representation of the model parameters.

In some implementations of the current disclosure, non-uniform quantization of the value space of the model parameters may be incorporated into the training process such that the training could be performed using floating-point operations to calculate the model parameters and the gradients, but the calculated model parameters would be quantized on the fly at each layer of the deep polynomial network and used in the next layer during the forward and back propagation of the training process. In addition, the quantization of the calculated floating-point model parameters and their gradients into fixed-point integer precision at each layer may be performed unevenly across the range of the fixed-point value space and based on statistical distribution of the values of the model parameters.

Figure 12:
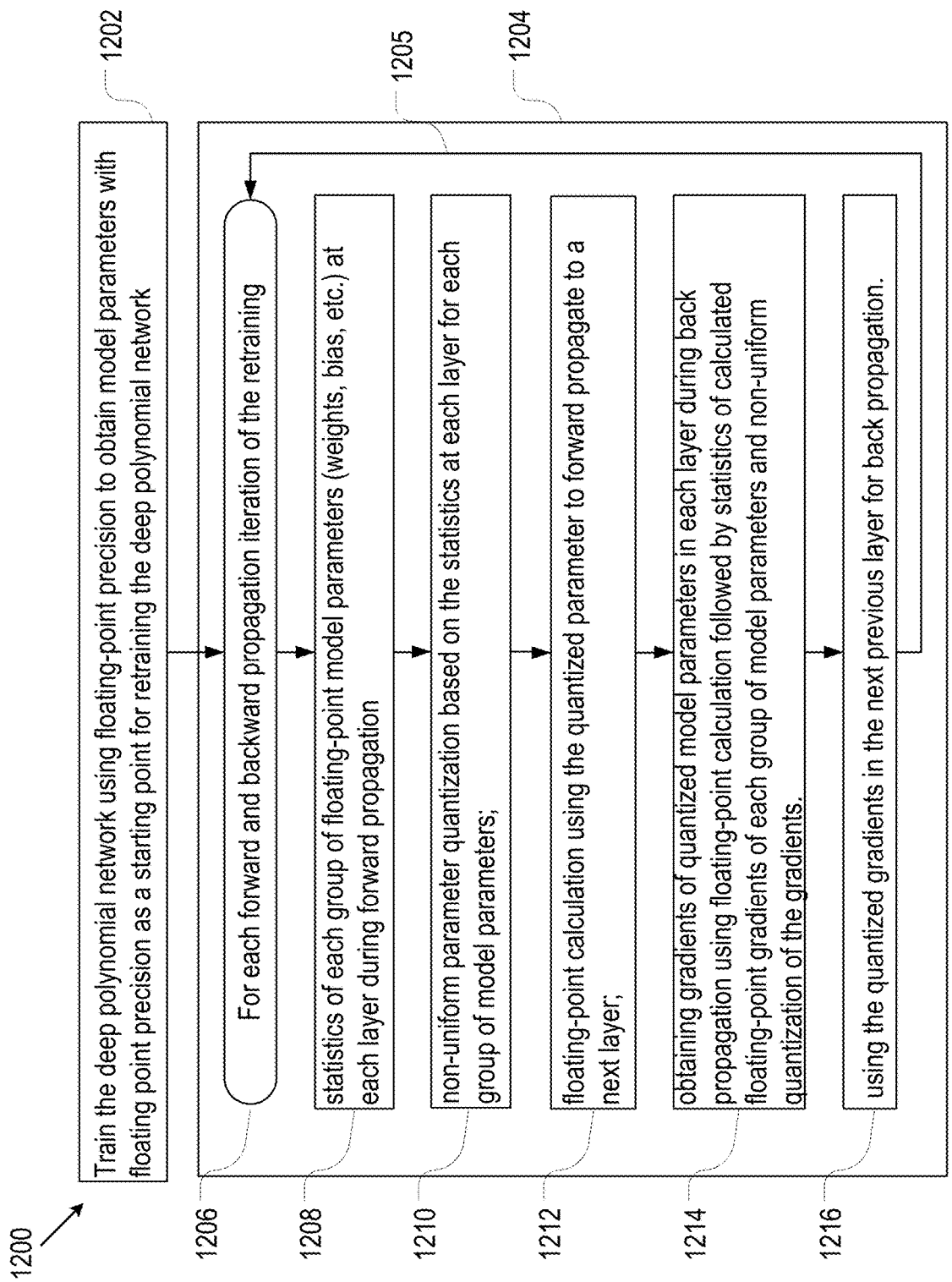
FIG. 12 shows a logic flow for training a deep polynomial neural network.

For example, as shown by the logic flow 1200 of FIG. 12, the deep polynomial network model may first be trained using floating point precision without any quantization to obtain a set of model parameters in floating-point precision (1202). After this initial training, the deep polynomial network may be retrained as shown in 1204 using the initially trained floating-point model parameters as a starting point. The retraining process 1204 is performed using the training dataset and further by incorporating non-uniform quantization to convert the initially trained polynomial network with floating point precision into a polynomial network with parameters of lower fixed-point precision and suitable for processing input data items using fixed-point calculations (such that the encryption algorithm discussed above is effectively homomorphic).

As shown by box 1206 and by the looping arrow 1205 of FIG. 12, the retraining process 1204 may be performed in multiple iterations using the training dataset. In the retraining logic flow 1204, steps 1208, 1210, and 1212 are related to forward propagation in the retraining process and steps 1214 and 1216 are related to back propagation in the retraining process.

In each of the iterations 1206 and 1205, statistics of each group of floating-point model parameters (weights, bias, etc.) of the deep polynomial network at each layer during forward propagation may be evaluated to determine the distribution of each group of parameters in the floating-point value space, as shown in 1208. The model parameters may be grouped by parameter type. Each type of model parameters may have very different value ranges and distributions. As such, statistics of each type of model parameters in floating-point value space may be evaluated separately. For example, the model parameters may be grouped into weight parameters, bias parameters, activation parameters, etc., at each network layer.

Based on the statistics of the value distribution for each group of the multiple groups of model parameters, the floating-point value space for each group may then be quantized into Q segments (or quantization levels), as shown in 1210. Q may be determined by the fixed-point precision. For example, if an 8-bit fixed-point precision is used, then the floating-point value space may be quantized into $Q=2^8=256$ segments (quantization levels). The quantization levels may be non-uniform in that the portion of the floating-point value space that are more crowded than others may be assigned denser quantization levels. The quantization levels may be determined using any algorithms. For example, the quantization level for a group of parameters may be based on Lloyd-max quantization algorithm. In some implementations, particular quantization restrictions may be applied. For example, zero may always be kept as one of the Q quantized levels regardless of whether any model parameters fall into this quantized level. This is because zero may have a special significance in convolutional neural network in general and deep polynomial network in particular, for, e.g., zero padding functions, and should be designated as a quantization level.

As further shown in step 1212 of the retraining logic flow 1204 of FIG. 12, after the quantization of the model parameter value space for the multiple groups of model parameters at a particular layer, the forward propagation may proceed to a next layer by performing floating-point calculations using the quantized model parameters.

As further shown in step 1214 of the retraining logic flow 1204 of FIG. 12, during back propagation, gradients of the model parameters at each network layer maybe be obtained using floating point calculations. Statistics of the value distribution of the gradients may then be performed followed by non-uniform quantization of the gradients in to Q quantized levels determined based on the statistics and a quantization algorithm, similar to the quantization of other model parameters described above. As shown in step 1216, the quantized gradients may then be back propagated to the next previous layer.

As such, the initial training and retraining process for the deep polynomial network incorporates non-uniform quantization of model parameters and gradients. The quantization levels may be determined dynamically and on the fly during the retraining process. Quantization levels for each types of parameters and at each network layers may be determined separately during the retraining process according to the value distribution statistics of the parameters obtained on the fly. The resulting deep polynomial model thus only includes model parameters with fixed-point precision but adapted to render the network reasonably accurate when the fixed-point parameters are used in conjunction of fixed-point forward propagation to process an input data item.

Figure 13:
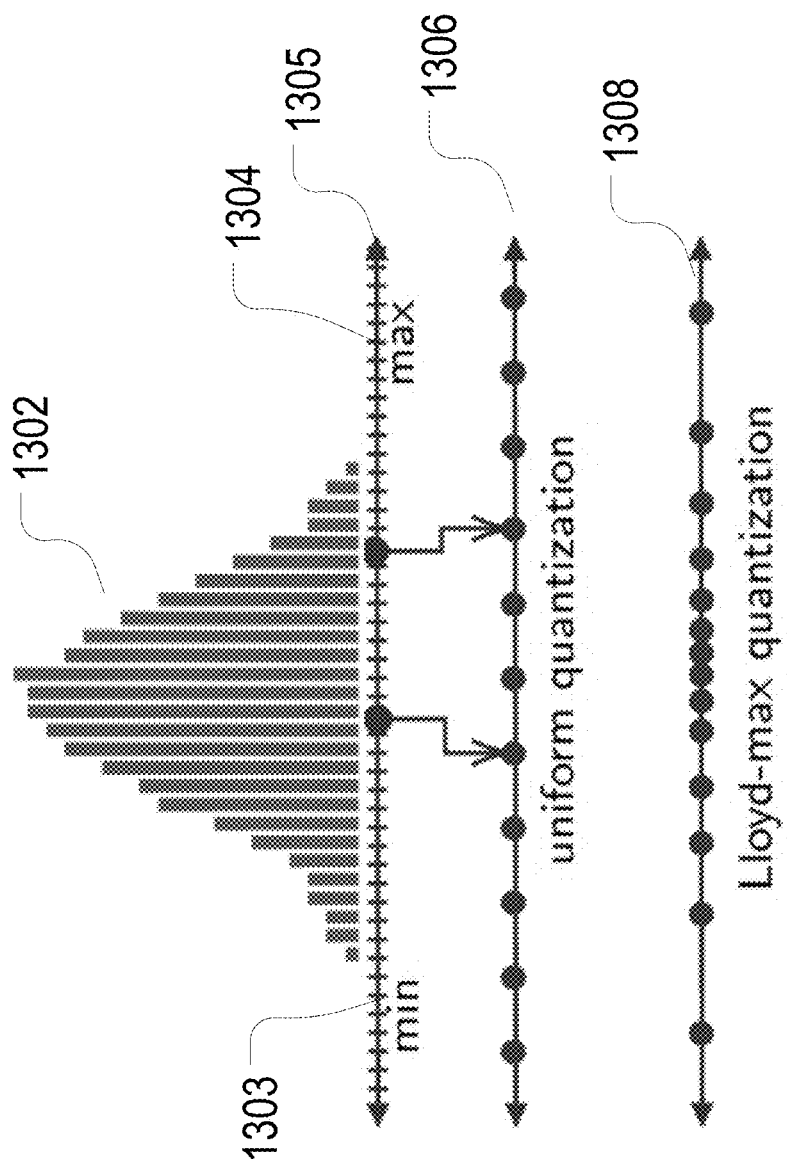
FIG. 13 illustrates an example quantization of model parameter value space of a deep polynomial network.

FIG. 13 illustrates an example quantization of model parameter (or gradient) value space. In FIG. 13, 1302 shows statistical distribution (histogram) of an exemplary group of weight parameter of a layer of the deep polynomial network in a uniform floating-point parameter value space 1304 between minimum 1303 and maximum 1305. In the example shown in 1302 and 1304, the weight parameter value distribution is, e.g., concentrated in the middle range and sparse at the two ends of the value space.

Continuing with FIG. 13, 1306 shows quantization of the floating-point value space 1304 into Q uniform quantized levels represented by the dots shown in 1306. Each dot corresponds to one of the Q fixed-point integer values. Direct quantization of the weight parameter in the high-resolution floating-point value space 1305 into the uniform lower-resolution fixed-point value space 1306 would waste quantization levels on the two ends of the parameter value space and yield relatively few quantization levels in the region where the weight parameters are concentrated. FIG. 13 further shows a Lloyd-max quantization 1308 of the floating-point parameter value space into Q non-uniform quantized levels represented by the dots in 1308, each corresponding to one of the Q fixed-point integer values. As shown in 1308, denser quantized levels are allocated in the more concentrated region of the floating-point value space according to the statistical distribution of 1302. The Lloyd-max quantization scheme described above is merely one of many examples. Other non-uniform quantization schemes may be applied.

Figure 14:
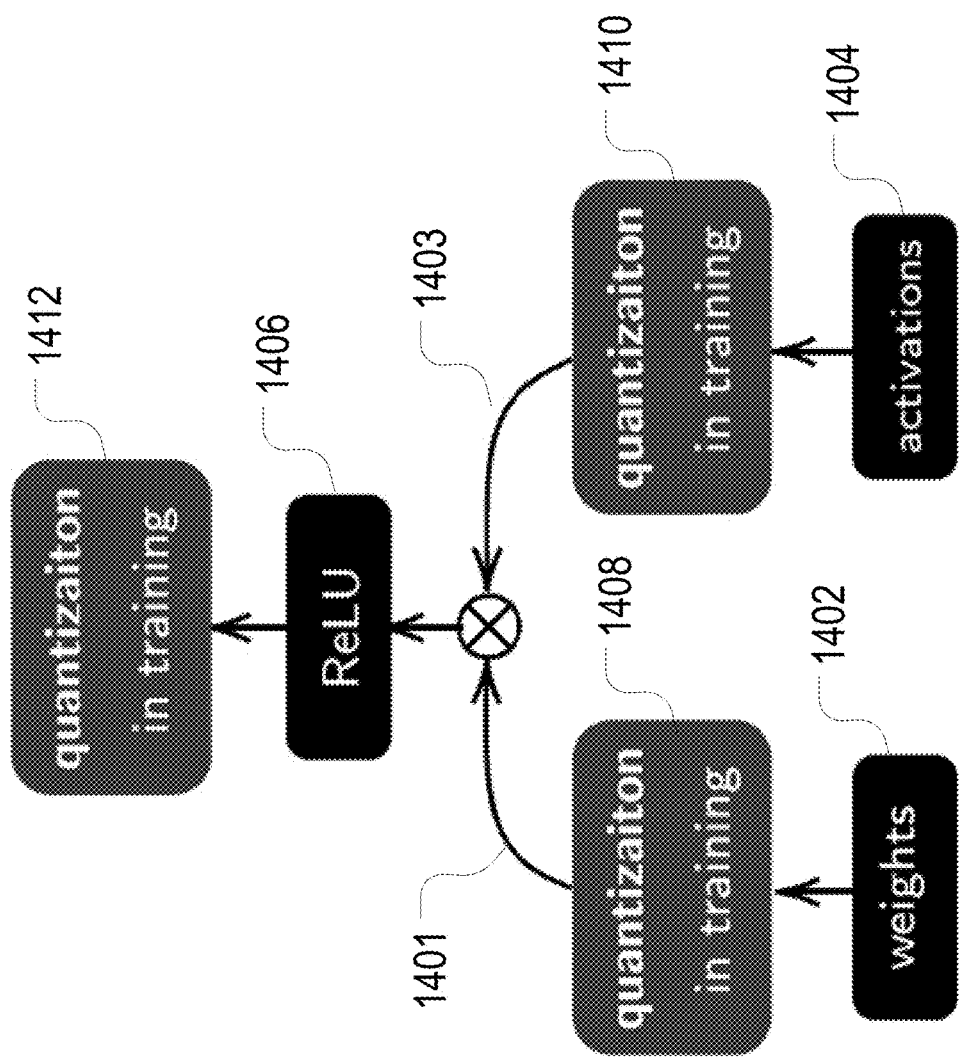
FIG. 14 illustrates a snapshot of retraining of a deep polynomial network using floating-point calculations but with non-uniform quantization of floating-point value space into a lower-resolution fixed-point value space.

FIG. 14 illustrates a snapshot of retraining of the deep polynomial network model using floating-point calculations but with non-uniform quantization into fixed-point value space during forward propagation through several network layers. As shown in FIG. 14, the floating-point calculation output of the various network operations (e.g., multiplication by weights, activation operations, rectification operation, such as 1402, 1404, and 1406) are quantized on the fly during the retraining process according to the non-uniform Lloyd-max quantization levels of FIG. 13, as shown by 1408, 1410, and 1412. The quantized output may be used in the floating point calculation towards a next layer, as shown by arrows 14-1 and 1403.

The implementations above in FIG. 12 starts with an initial deep polynomial network already modified from a traditional non-polynomial deep-learning neural network or deep-learning convolutional neural network. In some other implementations, as shown in Table 1, a traditional non-polynomial network model may be initially trained prior to modification to a corresponding deep polynomial network. After the initial training of the non-polynomial neural network, the corresponding deep polynomial network model may be initialized with model parameters derived from the model parameters of the initially trained non-polynomial neural network model (Step 1 of Table 1). Afterwards, retraining of the deep polynomial network model may be performed at a level of minibatch of training dataset, as illustrated in Table 1 below (Steps 2-4 of Table 1).

TABLE 1

Example Algorithm (Algorithm 1): Quantized training for DPN

Data: unencrypted training data.
Result: quantized deep polynomial network.
1.    Convert pre-trained DNN to DPN: $W_{DPN} \leftarrow W_{DNN}$
2    for each minibatch do
    Update $W_{DPN}$ in floating-point
3.    for each layer [I] do
    Optimize quantization levels: $c^{[I]} \leftarrow$ statistical distribution $(W_{DPN}^{[I]})$
    Quantization: $\tilde{W}_{DPN}^{[I]} \leftarrow$ Quant $(W_{DPN}^{[I]}, c^{[I]})$
4.    for each minibatch do
    Update all $\tilde{W}_{DPN}^{[I]}$ with on-the-fly quantization based on c.

In a particular implementation for training a deep polynomial network model and using the trained model for speech recognition, the models may be trained using a computational network toolkit (CNTK). The homomorphic encryption is implemented using SEAL (Simple Encrypted Arithmetic library) by Microsoft™. The effectiveness of the trained DPN model may be evaluated using the Switchboard and our voice assistant tasks.

For the Switchboard tasks, a 309-hr dataset and the NIST 2000 Hub5 are used as training and test datasets, respectively. The speech features used in this exemplary setup include a 40-dimensional LFB with utterance-level CMN. The outputs of the DPN include 9000 tied triphone states. The polynomial approximation is verified on two traditional neural network models. The first model (a deep-learning neural network (DNN)) includes a 6-layer ReLU network with batch normalization and 2048 units on each layer. The second model (a deep-learning convolutional neural network (CNN)) comprises a 17-layer neural network, including 3 convolution layers with 96 kernels of size 3×3, followed by max-pooling, followed by 4 convolution layers with 192 kernels of size 3×3, followed by max-pooling, followed by another 4 convolution layers with 384 kernels of size 3×3, followed by max-pooling, and further followed by 2 dense layers with 4096 units and a softmax layer. Both example models use [t−30; t+10] as the input context. The output of the models above and their corresponding deep polynomial approximation networks are then processed by a language model. The vocabulary size of the language model used is 226k. The WERs (Word Error Rates) of the first and the second models and the corresponding deep polynomial network models are shown in Table 2. All models are trained using CE criteria. The deep polynomial networks are trained following the algorithm of Table 1.

TABLE 2

| WER in % | | 16-bit | 8-bit | 4-bit | 2-bit |
|---|---|---|---|---|---|
| DNN | quantization + retrain | 14.7% | 14.9% | 16.6% | 100.4% |
|  |  | — | 14.7% | 14.9% | 30.3% |
| DNN→DPN (Alg. 1) |  | 15.8% | 15.8% | 16.1% | 30.8% |
| CNN | quantization + retrain | 12.2% | 12.7% | 15.4% | — |
|  |  | — | 12.3% | 12.7% | — |
| CNN→DPN (Alg. 1) |  | 13.5% | 13.6% | 14.0% | — |

For the voice assistant task, 3400 hours of US-English data are used for training and 6 hours data (5500 utterances) are used for testing. The speech features for the perception model used in this setup include 87-dim LFB with utterance level CMN. The neural network used in this setup contain the same structure as the first model above for the Switchboard case, but with 9404 tied triphone output states. Table 3 summarizes the WERs and the average latency per utterance (including encryption, AM scoring, decryption and decoding) on this task.

TABLE 3

|  |  |  | avg. latency per utterance | | |
|---|---|---|---|---|---|
|  | 16-bit | 4-bit | encryption | decryption | overall |
| DNN | 12.9% | 13.4% | — | — | 177 ms |
| DPN | 14.8% | 15.5% | 202 ms | 16 ms | 373 ms |

Figure 15:
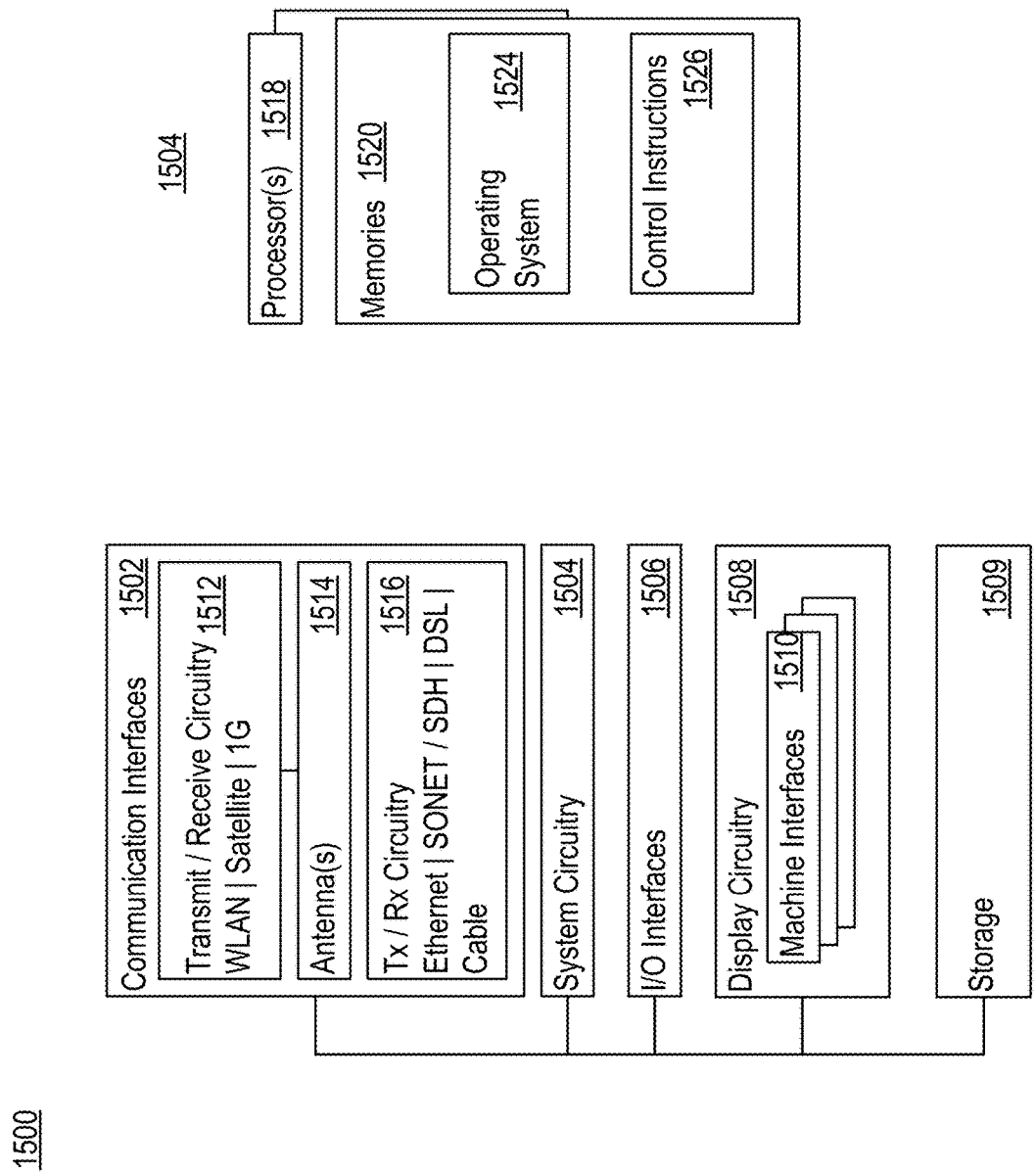
FIG. 15 shows various electronic components of a computing device that may be used as the terminal device or the server device in FIG. 1.

Finally, FIG. 15 shows an exemplary computer system 1500 for implementing any of the terminal or server computing components above. The computer system 1500 may include communication interfaces 1502, system circuitry 1504, input/output (I/O) interfaces 1506, storage 1509, and display circuitry 1508 that generates machine interfaces 1510 locally or for remote display, e.g., in a web browser running on a local or remote machine. The machine interfaces 1510 and the I/O interfaces 1506 may include GUIs, touch sensitive displays, voice or facial recognition inputs, buttons, switches, speakers and other user interface elements. Additional examples of the I/O interfaces 1506 include microphones, video and still image cameras, headset and microphone input/output jacks, Universal Serial Bus (USB) connectors, memory card slots, and other types of inputs. The I/O interfaces 1506 may further include magnetic or optical media interfaces (e.g., a CDROM or DVD drive), serial and parallel bus interfaces, and keyboard and mouse interfaces.

The communication interfaces 1502 may include wireless transmitters and receivers ("transceivers") 1512 and any antennas 1514 used by the transmitting and receiving circuitry of the transceivers 1512. The transceivers 1512 and antennas 1514 may support Wi-Fi network communications, for instance, under any version of IEEE $_{802.11}$, e.g., 802.11n or 802.11ac. The communication interfaces 1502 may also include wireline transceivers 1516. The wireline transceivers 1516 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage 1509 may be used to store various initial, intermediate, or final data. The storage 1509 may be separate or integrated with the one or more repositories 114 and 130 of FIG. 1. The storage 1509 may be centralized or distributed, and may be local or remote to the computer system 1500. For example, the storage 1509 may be hosted remotely by a cloud computing service provider.

The system circuitry 1504 may include hardware, software, firmware, or other circuitry in any combination. The system circuitry 1504 may be implemented, for example, with one or more systems on a chip (SoC), application specific integrated circuits (ASIC), microprocessors, discrete analog and digital circuits, and other circuitry. The system circuitry 1504 is part of the implementation of any desired functionality related to the system 100 of FIG. 1. As just one example, the system circuitry 1504 may include one or more instruction processors 1518 and memories 1520. The memories 1520 stores, for example, control instructions 1526 and an operating system 1524. In one implementation, the instruction processors 1518 executes the control instructions 1526 and the operating system 1524 to carry out any desired functionality related to any of the terminal and server components of FIG. 1.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

From the foregoing, it can be seen that this disclosure provides a system and a method for a cloud-local joint or collaborative data analytics based on data processing models trained and hosted in backend servers for processing data items preprocessed and encrypted by remote terminal devices. The data analytics models hosted in the backend servers generate encrypted output data items that are then communicated to the local terminal device requesting the data analytics service for decryption and post-processing. This framework functions without providing access to decryption keys of the local terminal devices to the backend servers and the communication network between the local terminal devices and the backend servers. This framework thus provides data privacy protection. The encryption/decryption and data analytics in the backend are configured to process and communicate data items efficiently to provide real-time or near real-time system response to requests for data analytics from the remote terminal devices. The data analytics models hosed in the backend servers, their operation, and their training process are adapted and modified such that they can process data items in encrypted form. No decryption keys are required in establishing and training the models. The same data analytics models may be used to provide services to different clients each having their own decryption keys. The framework and data analytics models may be used to provide a remote on-demand speech-recognition service other data analytics services.

What is claimed is:

1. A system for providing a remote data analytics, comprising:
   a communication interface;
   a memory for storing a deep learning neural network; and
   a circuitry in communication with the communication interface and the memory, and configured to:
   receive an encrypted data item from a remote terminal device via the communication interface;

forward propagate the encrypted data item through the deep learning neural network in encrypted form to obtain an encrypted output data item; and send the encrypted output data item to the remote terminal device via the communication interface, wherein:

the deep learning neural network is trained using un-encrypted training data and comprises neurons interconnected into a plurality of layers;

at least one activation operation and at least one pooling operation of the deep learning neural network are polynomialized;

the encrypted data item is based on public key encryption at the remote terminal device; and at least a subset of model parameters of the deep learning neural network trained using un-encrypted training data remain un-encrypted for forward propagation of the encrypted data item.

2. The system of claim 1, wherein the remote data analytics comprises a remote speech recognition service.

3. The system of claim 1, wherein:

the encrypted data item comprises concatenated features of a frame of an audio waveform of a predetermined frame duration derived at the remote terminal device using a speech perception model followed by an encryption at the remote terminal device;

the deep learning neural network comprises an acoustic model for processing the concatenated features encrypted by the remote terminal device into the encrypted output data item; and the encrypted output data item of the deep learning neural network comprises a probability vector corresponding to a phone codebook.

4. The system of claim 1, wherein the at least one pooling operation is polynomialized using a scaled mean pooling.

5. The system of claim 1, wherein the at least one activation operation is polynomialized using a third-degree polynomial approximation of a sigmoid function.

6. The system of claim 1, wherein the subset of model parameters comprise a plurality of weights and a plurality of batch normalization parameters.

7. The system of claim 6, wherein the subset of model parameters further comprise a plurality of convolutional kernels.

8. A system for providing a remote data analytics, comprising:

a communication interface;

a memory for storing a deep learning neural network; and a circuitry in communication with the communication interface and the memory, and configured to:

receive an encrypted data item from a remote terminal device via the communication interface;

forward propagate the encrypted data item through the deep learning neural network in encrypted form to obtain an encrypted output data item; and send the encrypted output data item to the remote terminal device via the communication interface, wherein:

the deep learning neural network is trained using un-encrypted training data and comprises neurons interconnected into a plurality of layers;

at least one activation operation and at least one pooling operation of the deep learning neural network are polynomialized; and the deep learning neural network is trained by:

initially training the deep learning neural network wherein a set of model parameters are trained to a first precision; and retraining the deep learning neural network by quantizing the set of model parameters to a second precision lower than the first precision during forward and backward propagation of training data.

9. The system of claim 8, wherein quantization levels for the set of model parameters are determined by calculating a statistical distribution of the set of model parameters of the first precision such that denser quantized levels are assigned around values of the set of model parameters that are more concentrated.

10. The system of claim 8, wherein the first precision of the second precision are represented by a first predetermined number of parameter bits and a second predetermined number of parameter bits for the set of model parameters, respectively, and wherein the second predetermined number of parameter bits is 8.

11. A system for providing a remote data analytics, comprising:

a communication interface;

a memory for storing a deep learning neural network; and a circuitry in communication with the communication interface and the memory, and configured to:

receive an encrypted data item from a remote terminal device via the communication interface;

forward propagate the encrypted data item through the deep learning neural network in encrypted form to obtain an encrypted output data item; and send the encrypted output data item to the remote terminal device via the communication interface, wherein:

the deep learning neural network is trained using un-encrypted training data and comprises neurons interconnected into a plurality of layers;

at least one activation operation and at least one pooling operation of the deep learning neural network are polynomialized;

the encrypted data item comprises an encrypted frame of audio waveform of a predetermined frame duration sent from the remote terminal device; and the circuitry further configures the deep learning neural network to:

convert the encrypted frame of audio waveform into perception features; and transform the perception features into the encrypted output data item comprising a probability vector corresponding to a phone codebook of the deep learning neural network.

12. The system of claim 1, wherein:

the encrypted data item comprises encrypted perception features of a plurality of frames of audio waveform each of a predetermined frame duration sent from the remote terminal device; and the circuitry further configures the deep learning neural network to:

transform the encrypted data item into a plurality of encrypted probability vectors corresponding to a phone codebook, each encrypted probability vector corresponding to one of the plurality of frames of audio waveform; and transform the plurality of encrypted probability vectors into the encrypted output data item comprising an encrypted text segment.

13. The system of claim 1, wherein:
the encrypted data item comprises a plurality of encrypted frames of audio waveform each of a predetermined frame duration sent from the remote terminal device; and
the circuitry further configures the deep learning neural network to:
convert the plurality of encrypted frames of audio waveform into a plurality sets of perception features;
transform the plurality of sets of perception features into a plurality of encrypted probability vectors corresponding to a phone codebook, each encrypted probability vector corresponding to one of the plurality of frames of audio waveform; and
transform the plurality of encrypted probability vectors into the encrypted output data item comprising an encrypted text segment.

14. A system for providing a remote data analytics, comprising:
a terminal device;
a remote server comprising:
a communication interface;
a memory for storing a deep learning neural network; and
a circuitry in communication with the communication interface and the memory,
wherein the terminal device and the circuitry of the remote server is configured to:
encrypt, by the terminal device, a data item to obtain an encrypted data item;
send, by the terminal device, an encrypted data item, to the communication interface of the remote server;
receive, by the circuitry, the encrypted data item from the terminal device via the communication interface;
forward propagate, by the circuitry, the encrypted data item through the deep learning neural network in encrypted form to obtain an encrypted output data item;
send, by the circuitry, the encrypted output data item to the terminal device via the communication interface;
receive, by the terminal device, the encrypted output data item from the remote server; and
decrypt, by the terminal device, the encrypted output data item to obtain a decrypted data item, and
wherein:
the deep learning neural network is trained using un-encrypted training data and comprises neurons interconnected into a plurality of layers;
at least one activation operation and at least one pooling operation of the deep learning neural network are polynomialized;
the remote data analytics comprises a remote speech recognition service;
the encrypted data item comprises concatenated features of a frame of an audio waveform of a predetermined frame duration derived at the terminal device using a speech perception model followed by an encryption at the terminal device; and
the circuitry further configures the deep learning neural network to process the concatenated features encrypted by the terminal device into the encrypted output data item wherein the encrypted output data item of the deep learning neural network comprises a probability vector corresponding to a phone codebook.

15. The system of claim 14, wherein at least a subset of model parameters of the deep learning neural network trained using un-encrypted training data remain un-encrypted for forward propagation of the encrypted data item.

16. The system of claim 14, wherein the deep learning neural network is trained by:
initially training the deep learning neural network wherein a set of model parameters are trained to a first precision; and
retraining the deep learning neural network by quantizing the set of model parameters to a second precision lower than the first precision during forward and backward propagation of training data.

17. A method for providing a remote data analytics performed by a server comprising a communication interface, a memory for storing a deep learning neural network, and a circuitry in communication with the communication interface and the memory, the method comprising:
receiving, by the circuitry, an encrypted data item from a remote terminal device via the communication interface;
forward propagating, by the circuitry, the encrypted data item through the deep learning neural network in encrypted form to obtain an encrypted output data item; and
sending, by the circuitry, the encrypted output data item to the remote terminal device via the communication interface,
wherein:
the deep learning neural network is trained using un-encrypted training data and comprises neurons interconnected into a plurality of layers, and wherein at least one activation operation and at least one pooling operation of the deep learning neural network are polynomialized;
the encrypted data item is based on public key encryption at the remote terminal device; and
at least a subset of model parameters of the deep learning neural network trained using un-encrypted training data remain un-encrypted for forward propagation of the encrypted data item.

* * * * *